(12) United States Patent
Muruganathan et al.

(10) Patent No.: US 11,184,787 B2
(45) Date of Patent: Nov. 23, 2021

(54) SYSTEMS AND METHODS FOR RELIABLE DYNAMIC INDICATION FOR SEMI-PERSISTENT CSI-RS

(71) Applicant: Telefonaktiebolaget LM Ericsson (publ), Stockholm (SE)

(72) Inventors: Siva Muruganathan, Stittsville (CA); Mattias Frenne, Uppsala (SE); Shiwei Gao, Nepean (CA); Stephen Grant, Pleasanton, CA (US); Robert Mark Harrison, Grapevine, TX (US)

(73) Assignee: Telefonaktiebolaget LM Ericcson (publ), Stockholm (SE)

( * ) Notice: Subject to any disclaimer, the term of this patent is extended or adjusted under 35 U.S.C. 154(b) by 0 days.

(21) Appl. No.: 15/765,784

(22) PCT Filed: Jan. 8, 2018

(86) PCT No.: PCT/SE2018/050006
§ 371 (c)(1),
(2) Date: Apr. 4, 2018

(87) PCT Pub. No.: WO2018/128580
PCT Pub. Date: Jul. 12, 2018

(65) Prior Publication Data
US 2019/0098523 A1    Mar. 28, 2019

Related U.S. Application Data

(60) Provisional application No. 62/444,241, filed on Jan. 9, 2017.

(51) Int. Cl.
*H04W 24/10*    (2009.01)
*H04L 5/00*    (2006.01)
(Continued)

(52) U.S. Cl.
CPC .......... *H04W 24/10* (2013.01); *H04B 7/0626* (2013.01); *H04L 5/005* (2013.01);
(Continued)

(58) Field of Classification Search
None
See application file for complete search history.

(56) References Cited

U.S. PATENT DOCUMENTS 10,361,827 B2 * 7/2019 Sayana ............... H04L 43/06
2009/0190528 A1 * 7/2009 Chung ................ H04B 7/0639
370/328

(Continued)

FOREIGN PATENT DOCUMENTS

CN    103875201 A    6/2014
CN    104662946 A    5/2015

(Continued)

OTHER PUBLICATIONS

3GPP TSG RAN WG1 Meeting #86; Goteborg, Sweden; Source: Huawei, Hisilicon; Title: Aperiodic CSI-RS transmission for beamformed CSI-RS (R1-167675)—Aug. 22-26, 2016.*

(Continued)

*Primary Examiner* — Andrew C Oh
(74) *Attorney, Agent, or Firm* — Baker Botts, LLP

(57) ABSTRACT

According to certain embodiments, a method in a wireless device is provided that includes receiving, from a network node, dynamic allocation signaling to commence measurement on a semi-persistent CSI-RS resource. A first measurement is performed on the CSI-RS resource. A first CSI report based only on the first measurement is transmitted to the network node. A trigger message is received from the network node that is different from the dynamic allocation (Continued)

signaling. The trigger message triggers semi-persistent CSI reporting, and the wireless device initiates semi-persistent reporting.

25 Claims, 21 Drawing Sheets

(51) Int. Cl.
  H04L 25/02 (2006.01)
  H04B 7/06 (2006.01)
(52) U.S. Cl.
  CPC .......... *H04L 5/0048* (2013.01); *H04L 5/0082* (2013.01); *H04L 5/0092* (2013.01); *H04L 5/0094* (2013.01); *H04L 25/0224* (2013.01)

(56) References Cited

U.S. PATENT DOCUMENTS

| | | | |
|---|---|---|---|
| 2011/0019637 A1* | 1/2011 | Ojala | H04L 1/0026 370/329 |
| 2011/0142095 A1* | 6/2011 | Guo | H04B 7/0684 375/133 |
| 2011/0235743 A1* | 9/2011 | Lee | H04J 11/00 375/295 |
| 2011/0249578 A1* | 10/2011 | Nazar | H04W 24/10 370/252 |
| 2011/0269490 A1* | 11/2011 | Earnshaw | H04L 1/0026 455/509 |
| 2011/0299484 A1* | 12/2011 | Nam | H04L 5/0057 370/329 |
| 2011/0305161 A1* | 12/2011 | Ekpenyong | H04L 5/0057 370/252 |
| 2011/0310759 A1* | 12/2011 | Gerstenberger | H04L 5/006 370/252 |
| 2012/0092989 A1* | 4/2012 | Baldemair | H04W 24/10 370/230 |
| 2012/0207047 A1* | 8/2012 | Liao | H04B 7/0417 370/252 |
| 2012/0327882 A1* | 12/2012 | Park | H04B 7/0632 370/329 |
| 2013/0121174 A1* | 5/2013 | Koivisto | H04B 7/0636 370/252 |
| 2013/0121301 A1* | 5/2013 | Kim | H04W 24/10 370/329 |
| 2013/0128859 A1* | 5/2013 | Takaoka | H04W 52/242 370/329 |
| 2013/0142134 A1* | 6/2013 | Zhu | H04L 5/0082 370/329 |
| 2013/0142163 A1* | 6/2013 | Liu | H04L 5/0053 370/329 |
| 2013/0201884 A1* | 8/2013 | Freda | H04W 74/0833 370/278 |
| 2013/0215811 A1* | 8/2013 | Takaoka | H04W 28/0268 370/311 |
| 2013/0286933 A1* | 10/2013 | Lee | H04L 5/001 370/315 |
| 2013/0294352 A1* | 11/2013 | Park | H04B 7/024 370/328 |
| 2013/0315114 A1* | 11/2013 | Seo | H04J 3/1694 370/280 |
| 2013/0315185 A1* | 11/2013 | Kim | H04L 5/0057 370/329 |
| 2013/0322277 A1* | 12/2013 | Vanganuru | H04L 1/20 370/252 |
| 2013/0322393 A1* | 12/2013 | Kishiyama | H04L 5/0092 370/329 |
| 2014/0029570 A1* | 1/2014 | Lee | H04W 36/0005 370/331 |
| 2014/0133418 A1* | 5/2014 | Takeda | H04L 5/0053 370/329 |
| 2014/0269451 A1* | 9/2014 | Papasakellariou | H04L 5/14 370/280 |
| 2014/0269460 A1* | 9/2014 | Papasakellariou | H04L 5/0048 370/294 |
| 2014/0328266 A1* | 11/2014 | Yu | H04L 5/0053 370/329 |
| 2015/0156763 A1* | 6/2015 | Seo | H04L 5/1469 370/329 |
| 2015/0172990 A1* | 6/2015 | Patel | H04W 36/00835 370/332 |
| 2015/0207600 A1* | 7/2015 | Park | H04W 56/0005 370/329 |
| 2015/0358139 A1* | 12/2015 | Li | H04L 5/0057 370/252 |
| 2015/0365925 A1* | 12/2015 | Fu | H04L 5/0048 370/329 |
| 2016/0105817 A1* | 4/2016 | Frenne | H04L 1/0026 370/252 |
| 2016/0105882 A1* | 4/2016 | Park | H04L 5/0053 370/329 |
| 2016/0149679 A1 | 5/2016 | Frenne et al. | |
| 2016/0182137 A1* | 6/2016 | Onggosanusi | H04B 7/0469 370/329 |
| 2016/0182208 A1* | 6/2016 | Yi | H04L 1/0026 370/329 |
| 2016/0197687 A1* | 7/2016 | Song | H04W 72/0446 370/252 |
| 2016/0198508 A1* | 7/2016 | Lee | H04W 76/14 370/329 |
| 2016/0211892 A1* | 7/2016 | Li | H04B 7/024 |
| 2016/0212733 A1* | 7/2016 | Davydov | H04L 5/0094 |
| 2016/0227428 A1* | 8/2016 | Novlan | H04W 48/16 |
| 2016/0227519 A1* | 8/2016 | Nimbalker | H04W 72/042 |
| 2016/0227530 A1* | 8/2016 | Davydov | H04B 7/0626 |
| 2016/0227548 A1* | 8/2016 | Nimbalker | H04B 7/0626 |
| 2016/0254901 A1* | 9/2016 | You | H04J 1/16 370/281 |
| 2016/0302230 A1* | 10/2016 | Novlan | H04J 11/0023 |
| 2016/0315745 A1* | 10/2016 | Kim | H04B 7/0469 |
| 2016/0323901 A1* | 11/2016 | Yum | H04L 5/0057 |
| 2016/0337916 A1* | 11/2016 | Deenoo | H04W 36/0088 |
| 2016/0381587 A1* | 12/2016 | Alexey | H04W 76/18 370/329 |
| 2017/0070276 A1* | 3/2017 | Kim | H04W 72/042 |
| 2017/0086172 A1* | 3/2017 | Dinan | H04W 72/0453 |
| 2017/0094528 A1* | 3/2017 | Takeda | H04W 16/32 |
| 2017/0118728 A1* | 4/2017 | Harada | H04W 16/14 |
| 2017/0238314 A1* | 8/2017 | Zhang | H04W 72/042 370/336 |
| 2017/0257848 A1* | 9/2017 | Olsson | H04L 5/001 |
| 2017/0265225 A1* | 9/2017 | Takeda | H04W 74/0816 |
| 2017/0289852 A1* | 10/2017 | Yang | H04L 5/0055 |
| 2017/0311311 A1* | 10/2017 | Frenne | H04L 5/0048 |
| 2017/0331577 A1* | 11/2017 | Parkvall | H04J 11/0079 |
| 2017/0331670 A1* | 11/2017 | Parkvall | H04L 41/0233 |
| 2017/0347270 A1* | 11/2017 | Iouchi | H04W 72/0406 |
| 2017/0359745 A1* | 12/2017 | Lee | H04W 72/14 |
| 2017/0359746 A1* | 12/2017 | Lee | H04L 5/0044 |
| 2017/0366998 A1* | 12/2017 | Lee | H04W 24/10 |
| 2017/0367087 A1* | 12/2017 | Seo | H04W 72/02 |
| 2018/0014219 A1* | 1/2018 | Takeda | H04W 72/14 |
| 2018/0026769 A1* | 1/2018 | Lee | H04L 5/001 370/329 |
| 2018/0027549 A1* | 1/2018 | Wang | H04L 5/0044 370/329 |
| 2018/0034525 A1* | 2/2018 | Park | H04B 7/0626 |
| 2018/0034608 A1* | 2/2018 | Seo | H04L 25/0228 |
| 2018/0062711 A1* | 3/2018 | Mizusawa | H04W 72/042 |
| 2018/0063736 A1* | 3/2018 | Sadeghi | H04W 24/10 |
| 2018/0083722 A1* | 3/2018 | Reial | H04W 24/08 |
| 2018/0091992 A1* | 3/2018 | Frenne | H04L 5/0048 |
| 2018/0098266 A1* | 4/2018 | Futaki | H04L 5/0053 |
| 2018/0115992 A1* | 4/2018 | Park | H04W 74/0808 |
| 2018/0167930 A1* | 6/2018 | Huang | H04L 5/0053 |
| 2018/0205503 A1* | 7/2018 | Chen | H04L 1/18 |
| 2018/0220318 A1* | 8/2018 | Uemura | H04W 24/10 |
| 2018/0234871 A1* | 8/2018 | Ahn | H04W 24/10 |
| 2018/0241523 A1* | 8/2018 | Noh | H04L 5/0048 |
| 2018/0242285 A1* | 8/2018 | Yoo | H04B 7/0617 |
| 2018/0248606 A1* | 8/2018 | Choi | H04B 7/0634 |

(56) References Cited

U.S. PATENT DOCUMENTS

| | | | | |
|---|---|---|---|---|
| 2018/0254860 | A1* | 9/2018 | Wong | H04L 1/1664 |
| 2018/0262251 | A1* | 9/2018 | Kim | H04B 7/0465 |
| 2018/0310193 | A1* | 10/2018 | Bhorkar | H04B 7/0626 |
| 2018/0323848 | A1* | 11/2018 | Mizusawa | H04W 16/28 |
| 2018/0338318 | A1* | 11/2018 | Yum | H04W 72/1205 |
| 2018/0352582 | A1* | 12/2018 | Yi | H04W 72/1257 |
| 2018/0375560 | A1* | 12/2018 | Wei | H04B 7/0452 |
| 2019/0020987 | A1* | 1/2019 | Khoryaev | H04W 72/042 |
| 2019/0089423 | A1* | 3/2019 | Davydov | H04B 7/0478 |
| 2019/0097693 | A1* | 3/2019 | Park | H04L 5/0023 |
| 2019/0116602 | A1* | 4/2019 | Zhang | H04L 5/0073 |
| 2019/0215084 | A1* | 7/2019 | Nurminen | H04W 16/14 |
| 2019/0223161 | A1* | 7/2019 | Muruganathan | H04B 7/02 |
| 2019/0230536 | A1* | 7/2019 | Silva | H04W 36/0058 |
| 2019/0268938 | A1* | 8/2019 | Zhao | H04L 5/0048 |
| 2019/0281509 | A1* | 9/2019 | Tidestav | H04W 36/0083 |
| 2019/0342802 | A1* | 11/2019 | Du | H04W 76/34 |
| 2019/0357057 | A1* | 11/2019 | Cirkic | H04W 16/22 |
| 2020/0052759 | A1* | 2/2020 | Zhang | H04L 5/0094 |
| 2020/0067583 | A1* | 2/2020 | Shin | H04B 7/0486 |
| 2020/0252951 | A1* | 8/2020 | Frenne | H04B 7/0617 |

FOREIGN PATENT DOCUMENTS

| | | |
|---|---|---|
| GN | 103167615 A | 6/2013 |
| JP | 2017-537486 A | 12/2017 |
| WO | 2016 056980 A1 | 4/2016 |

OTHER PUBLICATIONS

3GPP TR 38.802 v1.0.0; Technical Specification; 3rd Generation Partnership Project; Technical Specification Group Radio Access Network; Study on New Radio (NR) Access Technology Physical Layer Aspects (Release 14)—Nov. 2016.
ETSI TS 136 211 v12.5.0; Technical Specification; LTE; Evolved Universal Terrestrial Radio Access (E-UTRA) Physical channels and modulation (3GPP TS 36.211 version 12.5.0 Release 12)—Apr. 2015.
PCT Written Opinion of the International Searching Authority for International application No. PCT/SE2018/050006—dated Apr. 6, 2018.
PCT International Search Report for International application No. PCT/SE2018/050006—dated Apr. 6, 2018.
PCT Notification of Transmittal of the International Search Report and the Written Opinion of the International Searching Authority, or the Declaration for International application No. PCT/SE2018/050006—dated Apr. 6, 2018.
3GPP TSG-RAN WG1#87; Reno, USA; Source: Nokia, Alcatel-Lucent Shanghai Bell; Title: On the CSI timing relationships (R1-1612872)—Nov. 14-18, 2016.
3GPP TSG RAN WG1 Meeting #87; Reno, USA; Source: Huawei, HiSilicon; Independent and joint control of CSI-RS transmission and CSI reporting for NR MIMO (R1-1611236)—Nov. 14-18, 2016.
3GPP TSG-RAN WG1 #87; Reno, Nevada; Source: Xinwei; Title: Further Discussion on Beam Management and CSI Acquisition (R1-1612258)—Nov. 14-18, 2016.
3GPP TSG RAN WG1 Meeting #87; Reno, USA; Source: Huawei, HiSilicon; Title: On the need for more flexible configurations related to CSI reporting (R1-1611237)—Nov. 14-18, 2016.
Japanese Office Action issued for Application No. 2019-530171—dated Jul. 27, 2020.
3GPP TSG RAN WG1 Meeting #87; Reno, USA; Source: LG Electronics; Title: Discussion on CSI measurement framework (R1-1611822)—Nov. 14-18, 2016.
3GPP TSG-RAN WG1 #87; Reno, Nevada; Source: Ericsson; Title: On CSI measurements and reporting (R1-1612349)—Nov. 14-18, 2016.
3GPP TSG-RAN WG1 #87ah-NR; Spokane, WA, USA; Source: Ericsson; Title: On Dynamic Signalling for Aperiodic and Semi-Persistent CSI-RS (R1-1700761)—Jan. 16-20, 2017.
Notice of Preliminary Rejection issued by the Korean Intellectual Property Office for Patent Application No. 10-2019-7018945—dated Sep. 8, 2020.
3GPP TSG RAN WG1 #87; Reno, USA; Source: Samsung; Title: Discussions on periodic and semi-persistent CSI Yeporting for NR (R1-1612505)—Nov. 14-18, 2016.
Korean Notice of Allowance issued for Patent customer No. 519987015051—dated Mar. 26, 2021.
Examination Report issued by the Government of India for Application No. 201917021561—dated Feb. 1, 2021.
Chinese Office Action issued for Application No. 201880006357.7—dated Jun. 10, 2021.

* cited by examiner

SYSTEMS AND METHODS FOR RELIABLE DYNAMIC INDICATION FOR SEMI-PERSISTENT CSI-RS

PRIORITY

This nonprovisional application is a U.S. National Stage Filing under 35 U.S.C. § 371 of International Patent Application Serial No. PCT/SE2018/050006 filed Jan. 8, 2018, and entitled "Systems and Methods for Reliable Dynamic Indication for Semi-Persistent CSI-RS" which claims priority to U.S. Provisional Patent Application No. 62/444,241 filed Jan. 9, 2017, both of which are hereby incorporated by reference in their entirety.

TECHNICAL FIELD

The present disclosure relates, in general, to wireless communications and, more particularly, systems and methods for reliable dynamic indication for semi-persistent channel state information-reference signal (CSI-RS).

BACKGROUND

The fifth generation of mobile telecommunications and wireless technology is not yet fully defined but in an advanced draft stage within 3GPP. It includes work on 5G New Radio (NR) Access Technology. Long-Term Evolution (LTE) terminology is used in this disclosure in a forward looking sense, to include equivalent 5G entities or functionalities although a different term is specified in 5G. A general description of the agreements on 5G New Radio (NR) Access Technology so far is contained in 3GPP TR 38.802 V1.0.0 (2016-11). Final specifications may be published inter alia in the future 3GPP TS 38.2** series.

The next generation mobile wireless communication system (5G or NR) may support a diverse set of use cases and a diverse set of deployment scenarios. The latter may include deployment at both low frequencies (100s of MHz), similar to LTE today, and very high frequencies (mm waves in the tens of GHz). At high frequencies, propagation characteristics make achieving good coverage challenging. One solution to the coverage issue may include employing high-gain beamforming, typically facilitated by analog circuitry, in order to achieve satisfactory link budget. Beamforming will also be used at lower frequencies (typically digital beamforming using mainly digital circuitry), and is expected to be similar in nature to the already standardized 3GPP LTE system (4G).

Some of the key aspects of LTE are described herein. Of particular relevance is discussion of channel state information-reference signal (CSI-RS). A similar signal is expected to be designed also for NR and is the subject of the disclosure below.

Note that terminology used here such as gNodeB (gNB) and user equipment (UE) should be considered non-limiting and does in particular not imply a certain hierarchical relation between the two; in general "gNB" could be read as a reference to generic device 1 and "UE" as device 2, wherein these two generic devices communicate with each other over some radio channel. Alternatively, other terminology such as "gNodeB" can be used in place of "gNB" in different communication systems. Herein, the focus is on wireless transmissions in the downlink, but the techniques are equally applicable in the uplink.

LTE and NR use orthogonal frequency division multiplexing (OFDM) in the downlink and discrete Fourier transform spread (DFT-spread) OFDM or OFDM in the uplink. FIG. 1 illustrates the basic LTE downlink physical resource. LTE uses OFDM in the downlink and DFT-spread OFDM in the uplink. The basic LTE downlink physical resource can thus be seen as a time-frequency grid, where each resource element (or time/frequency resource element (TFRE)) corresponds to one OFDM subcarrier during one OFDM symbol interval. Although a subcarrier spacing of $\Delta f=15$ kHz is shown in FIG. 1, different subcarrier spacing values are supported in NR. The supported subcarrier spacing values (also reference to as different numerologies) in NR are given by $\Delta f=(15 \times 2^{\alpha})$ kHz where $\alpha$ is a non-negative integer.

FIG. 2 illustrates the LTE time-domain structure. In the time domain, LTE downlink transmissions are organized into radio frames of 10 ms. Each radio frame consists of ten equally-sized subframes of length $T_{subframe}=1$ ms. In NR, subframe length is fixed at 1 ms as in LTE. A subframe in NR is further divided into a number of slots each with 14 OFDM symbols. The slot length for a reference numerology of $(15 \times 2^{\alpha})$ kHz is exactly $2^{-\alpha}$ ms.

The resource allocation in LTE is typically described in terms of resource blocks, where a resource block corresponds to one slot (0.5 ms) in the time domain and 12 contiguous subcarriers in the frequency domain. Resource blocks are numbered in the frequency domain, starting with 0 from one end of the system bandwidth. For NR, a resource block is also 12 subcarriers in frequency domain.

Downlink transmissions are dynamically scheduled. For example, in each subframe or slot, the gNB may transmit control information about to which terminals data is transmitted and upon which resource blocks the data is transmitted, in the current downlink subframe or slot. This control signaling is typically transmitted in the first 1, 2, 3 or 4 OFDM symbols in each subframe in LTE and 1 or 2 OFDM symbols of a slot in NR. A downlink system with 3 OFDM symbols as control for LTE is illustrated in FIG. 3.

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

NR is currently evolving with MIMO support. A core component in NR is the support of MIMO antenna deployments and MIMO related techniques including beamforming at higher carrier frequencies. Currently LTE and NR support an 8-layer spatial multiplexing mode for up to 32 transmit (Tx) antennas with channel dependent precoding. The spatial multiplexing mode is aimed for high data rates in favorable channel conditions.

FIG. 4 illustrates an example spatial multiplexing operation. More particularly, FIG. 4 illustrates an example transmission structure of precoded spatial multiplexing mode in LTE and NR. As depicted, the information carrying symbol vector s is multiplied by an $N_T \times r$ precoder matrix W, which serves to distribute the transmit energy in a subspace of the $N_T$ (corresponding to $N_T$ antenna ports) dimensional vector space. The precoder matrix is typically selected from a codebook of possible precoder matrices, and typically indicated by means of a precoder matrix indicator (PMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same time/frequency resource element (TFRE). The number of symbols r is typically adapted to suit the current channel properties.

LTE and NR use OFDM in the downlink and hence the received $N_R \times 1$ vector $y_n$ for a certain TFRE on subcarrier n (or alternatively data TFRE number n) is thus modeled by $$y_n = H_n W s_n + e_n$$

where $e_n$ is a noise/interference vector obtained as realizations of a random process. The precoder W can be a wideband precoder, which is constant over frequency, or frequency selective.

The precoder matrix is often chosen to match the characteristics of the $N_R \times N_T$ MIMO channel matrix $H_n$, resulting in so-called channel-dependent precoding. This is also commonly referred to as closed-loop precoding and essentially strives for focusing the transmit energy into a subspace which is strong in the sense of conveying much of the transmitted energy to the UE. In addition, the precoder matrix may also be selected to strive for orthogonalizing the channel, meaning that after proper linear equalization at the UE, the inter-layer interference is reduced.

The transmission rank, and thus the number of spatially multiplexed layers, is reflected in the number of columns of the precoder. For efficient performance, it is important that a transmission rank that matches the channel properties is selected.

In LTE and NR, a reference signal is introduced for the intent to estimate channel state information, the CSI-RS. The CSI-RS provides several advantages over basing the channel state information (CSI) feedback on the common reference symbols (CRS) which were used, for that purpose, in previous releases of LTE. Firstly, the CSI-RS is not used for demodulation of the data signal, and thus does not require the same density as CRS (i.e., the overhead of the CSI-RS is substantially less). Secondly, CSI-RS provides a much more flexible means to configure CSI feedback measurements (e.g., which CSI-RS resource to measure on can be configured in a UE specific manner).

By measuring on a CSI-RS, a UE can estimate the effective channel the CSI-RS is traversing including the radio propagation channel and antenna gains. In more mathematical rigor, this implies that if a known CSI-RS signal, x, is transmitted, a UE can estimate the coupling between the transmitted signal and the received signal (i.e., the effective channel). Hence, if no virtualization is performed in the transmission, the received signal, y, can be expressed as $$y = Hx + e,$$

where, again, e is noise/interference obtained as realizations of a random process, and the UE can estimate the effective channel H. Up to 32 CSI-RS ports can be configured for a LTE or NR UE. That is, the UE can estimate the channel from up to thirty-two transmit antenna ports.

An antenna port is equivalent to a reference signal resource that the UE shall use to measure the channel. Hence, a gNB with two antennas could define two CSI-RS ports, where each port is a set of resource elements in the time frequency grid within a subframe or slot. The base station transmits each of these two reference signals from each of the two antennas so that the UE can measure the two radio channels and report channel state information back to the base station based on these measurements. In LTE, CSI-RS resources with 1, 2, 4, 8, 12, 16, 20, 24, 28 and 32 ports are supported.

In LTE, the CSI-RS utilizes an orthogonal cover code (OCC) of length two to overlay two antenna ports on two consecutive resource elements (REs). FIGS. 5A-5C illustrate resource element grids. More particularly, FIGS. 5A-5C illustrate RE grids over a resource block (RB) pair showing potential positions for LTE Release 9/10 UE specific RS, CSI-RS (marked with a number corresponding to the CSI-RS antenna port), and CRS. The CSI-RS utilizes an orthogonal cover code (OCC) of length two to overlay two antenna ports on two consecutive REs. As shown in FIGS. 5A-5C, many different CSI-RS patterns are available. For the case of 2 CSI-RS antenna ports, we see that there are 20 different patterns within a subframe. The corresponding number of patterns is 10 and 5 for 4 and 8 CSI-RS antenna ports, respectively. For TDD, some additional CSI-RS patterns are available.

The CSI reference signal configurations are shown in TABLE 6.10.5.2-1 below, taken from TS 36.211 v12.5.0. For example, the CSI RS configuration 5 for 4 antennas ports use (k', l')=(9,5) in slot 1 (the second slot of the subframe). Using the formulas below, it can be determined that port 15, 16, use OCC over the resource elements (k,l)=(9,5), (9,6) and ports 17, 18 use OCC over resource elements (3,5), (3,6), respectively (assuming physical resource block (PRB) index m=0), where k is the subcarrier index and l is the OFDM symbol index within each slot.

The OCC is introduced below by the factor $w_{l''}$.

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & \text{CSI reference signal configurations 0-19, normal cyclic prefix} \\ 2l'' & \text{CSI reference signal configurations 20-31, normal cyclic prefix} \\ l'' & \text{CSI reference signal configurations 0-27, extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{\max,DL} - N_{RB}^{DL}}{2} \right\rfloor$$

TABLE 6.10.5.2-1

Mapping from CSI reference signal configuration to (k', l') for normal cyclic prefix

| | CSI reference signal configuration | 1 or 2 | | 4 | | 8 | |
|---|---|---|---|---|---|---|---|
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

In NR, the following three types of CSI-RS transmissions are supported:

Aperiodic CSI-RS Transmission: This is a one-shot CSI-RS transmission that can happen in any subframe or slot. Here, one-shot means that CSI-RS transmission only happens once per trigger in one slot or subframe. The CSI-RS resources (i.e., the resource element locations which consist of subcarrier locations and OFDM symbol locations) for aperiodic CSI-RS are preconfigured to UEs via higher layer signaling. The transmission of aperiodic CSI-RS is triggered by dynamic signaling.

Periodic CSI-RS Transmission: These CSI-RS transmissions are preconfigured by higher layer signaling and the preconfiguration includes parameters such as periodicity and subframe or slot offset similar to LTE. Periodic CSI-RS is controlled by higher layer signaling only and dynamic signaling is not needed to trigger periodic CSI-RS transmission. That is, the periodic CSI-RS transmission starts following RRC configuration following the configured parameters.

Semi-Persistent CSI-RS Transmission: Similar to periodic CSI-RS, resources for semi-persistent CSI-RS transmissions are preconfigured via higher layer signaling with parameters such as periodicity and subframe or slot offset. However, unlike periodic CSI-RS, dynamic allocation signaling is needed to begin transmission of semi-persistent CSI-RS on the preconfigured resources. FIG. 6 illustrates semi-persistent CSI-RS transmitted for a limited time duration (which is referred to as 'the time duration when semi-persistent CSI-RS' is allocated in the figure). In some cases, dynamic deallocation signaling is needed to stop transmission of semi-persistent CSI-RS.

In addition to multiple types of CSI-RS transmissions, NR also supports multiple types of CSI reporting. The following types of CSI reporting will be supported in NR:

Aperiodic CSI Reporting: This type of CSI reporting involves a single-shot (i.e., one time) CSI report by the UE which is dynamically triggered by the gNB.

Periodic CSI Reporting: CSI is reported periodically by the UE. Parameters such as periodicity and subframe or slot offset are configured by higher layer signaling.

Semi-Persistent CSI Reporting: similar to periodic CSI reporting, semi-persistent CSI reporting has a periodicity and subframe or slot offset. However, a dynamic trigger may be needed to begin semi-persistent CSI reporting. In some cases, a dynamic trigger may be needed to stop the semi-persistent CSI reporting.

With regards to relating the different CSI-RS types to the different CSI reporting types, the following combinations will be supported in NR:

Aperiodic CSI reporting with aperiodic CSI-RS

Aperiodic CSI reporting with semi-persistent/periodic CSI-RS

Semi-persistent or periodic CSI reporting with semi-persistent or periodic CSI-RS LTE control signaling can be carried in a variety of ways, including carrying control information on a physical downlink control channel (PDCCH) or a physical uplink control channel (PUCCH), embedded in a physical uplink shared channel (PUSCH), in medium access control-control elements (MAC-CEs), or in RRC signaling. Each of these mechanisms is customized to carry a particular kind of control information.

Control information carried on PDCCH, PUCCH, or embedded in PUSCH is physical layer related control information, such as downlink control information (DCI), uplink control information (UCI), as described in 3GPP TS 36.211, 36.212, and 36.213, or corresponding specifications in the 38 series. DCI is generally used to instruct the UE to perform some physical layer function, providing the needed information to perform the function. UCI generally provides the network with needed information, such as hybrid automatic repeat request-acknowledgment (HARQ-ACK), scheduling request (SR), channel state information (CSI), including channel quality indicator (CQI), pre-coding matrix indicator (PMI), rank indicator (RI), and/or contention resolution identity (CRI). UCI and DCI can be transmitted on a subframe-by-subframe basis, and so are designed to support rapidly varying parameters, including those that can vary with a fast fading radio channel. Because UCI and DCI can be transmitted in every subframe, UCI or DCI corresponding to a given cell tend to be on the order of tens of bits, in order to limit the amount of control overhead.

Control information carried in MAC CEs is carried in MAC headers on the uplink and downlink shared transport channels (UL-SCH and DL-SCH), as described in 3GPP TS 36.321. Since a MAC header does not have a fixed size, control information in MAC CEs can be sent when it is needed, and does not necessarily represent a fixed overhead. Furthermore, MAC CEs can carry larger control payloads efficiently, since they are carried in UL-SCH or DL-SCH transport channels, which benefit from link adaptation, HARQ, and can be turbo coded. MAC CEs are used to perform repetitive tasks that use a fixed set of parameters, such as maintaining timing advance or buffer status reporting, but these tasks generally do not require transmission of a MAC CE on a subframe-by-subframe or slot-by-slot basis. Consequently, channel state information related to a fast fading radio channel, such as PMI, CQI, RI, and CRI are not carried in MAC CEs in LTE up to Rel-14.

With regards to dynamic allocation signaling to begin transmission of semi-persistent CSI-RS, one solution is to use a MAC CE based indication. FIG. 7 illustrates an example of MAC CE based dynamic allocation signaling for beginning semi-persistent CSI-RS transmission. With this MAC CE based solution, generally there is a delay, denoted as X, between the dynamic allocation signaling and the beginning of semi-persistent CSI-RS measurement. This delay includes the following:

MAC CE decoding delay at the UE

The time delay due to HARQ ACK/NACK feedback on the dynamic allocation signal which is sent from the UE to the gNB Thus, a major problem with the MAC CE based dynamic allocation to begin semi-persistent CSI-RS measurement is that it involves long allocation latencies. The gNB does not have much control over the time gap between dynamic allocation and the beginning of semi-persistent CSI-RS measurement as this time gap X is determined by MAC CE decoding delay and HARQ ACK/NACK feedback delay, etc.

With regards to dynamic deallocation signaling to stop transmission of semi-persistent CSI-RS, one solution is to use a MAC CE based indication. FIG. 8 illustrates an example of MAC CE based dynamic deallocation signaling for stopping semi-persistent CSI-RS transmission. In FIG. 8, the delay between the dynamic deallocation signal and the ending of the semi-persistent CSI-RS measurement is denoted as Y. Due to reasons stated above, a major problem with the MAC CE based dynamic deallocation to stop semi-persistent CSI-RS transmission is that it involves long deallocation delays. The gNB does not have much control over the time gap between dynamic deallocation and the stopping of semi-persistent CSI-RS measurement as this time gap Y is determined by MAC CE decoding delay and HARQ ACK/NACK feedback delay, etc.

Another solution to dynamically indicate the starting or stopping of semi-persistent CSI-RS measurements is to use DCI. FIG. 9 illustrates the problems for the combination of semi-persistent CSI-RS measurement with semi-persistent CSI reporting, the above problems are also present when semi-persistent CSI-RS is combined with aperiodic (single-shot) CSI reporting DCI based dynamic indication for semi-persistent CSI-RS measurement provides better control of the time gaps X and Y abovementioned. However, since there is no HARQ acknowledgement associated with the reception of the DCI, the gNB does not know whether or not the UE has successfully received the DCI indication. Thus, reliability is a problem associated with DCI based dynamic indication to start/stop semi-persistent CSI-RS measurements.

Although FIGS. 7-9 illustrate the problems for the combination of semi-persistent CSI-RS measurement with semi-persistent CSI reporting, the above problems are also present when semi-persistent CSI-RS is combined with aperiodic (single-shot) CSI reporting.

SUMMARY

To address the foregoing problems with existing solutions, disclosed is systems and methods for reliable dynamic indication for semi-persistent CSI-RS. According to certain embodiments, a method in a wireless device is provided that includes receiving, from a network node, dynamic allocation signaling to commence measurement on a semi-persistent CSI-RS resource. A first measurement is performed on the CSI-RS resource. A first CSI report based only on the first measurement is transmitted to the network node. A trigger message is received from the network node that is different from the dynamic allocation signaling. The trigger message triggers semi-persistent CSI reporting, and the wireless device initiates semi-persistent reporting.

According to certain embodiments, a wireless device is provided that includes a memory storing instructions and processing circuitry operable to execute the instructions to cause the wireless device to receive, from a network node, dynamic allocation signaling to commence measurement of a semi-persistent CSI-RS resource. A first measurement of the CSI-RS resource is performed, and a first CSI report based only on the first measurement is transmitted to the network node. A trigger message is received from the network node that is different from the dynamic allocation signaling. The trigger message triggers semi-persistent CSI reporting, and the wireless device initiates semi-persistent reporting.

According to certain embodiments, a method in a network node includes transmitting, to a wireless device, dynamic allocation signaling to initiate measurement of a semi-persistent CSI-RS resource. It is determined whether a first CSI report is transmitted by the wireless device in response to the dynamic allocation signaling and an action is taken based on whether the first CSI report is received in response to the dynamic allocation trigger.

According to certain embodiments, a network node includes a memory storing instructions and processing circuitry operable to execute the instructions to cause the network node to transmit, to a wireless device, dynamic allocation signaling to initiate measurement of a semi-persistent CSI-RS resource. It is determined whether a first CSI report is transmitted by the wireless device in response to the dynamic allocation signaling and an action is taken based on whether the first CSI report is received in response to the dynamic allocation trigger.

Certain embodiments of the present disclosure may provide one or more technical advantages. For example, certain embodiments may avoid the long allocation/deallocation latencies associated with schemes such as MAC CE based allocation/deallocation. According to certain embodiments, a technical advantage may be that the semi-persistent CSI-RS measurement can occur in the same subframe or slot as the activation/allocation trigger. Still another technical advantage may be the high reliability of the DCI based allocation or deallocation to start or stop semi-persistent CSI-RS measurements (and thus gNB transmissions of CSI-RS), which has similar reliability as MAC CE based approaches.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
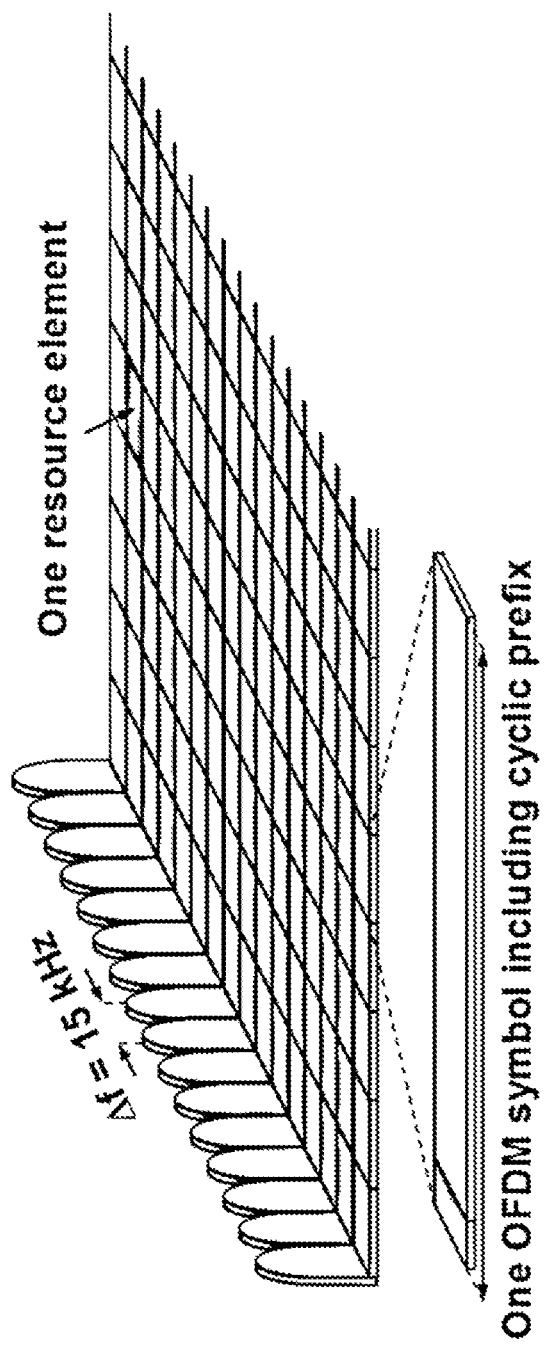
FIG. 1 illustrates the basic Long Term Evolution (LTE) downlink physical resource.
Figure 2:
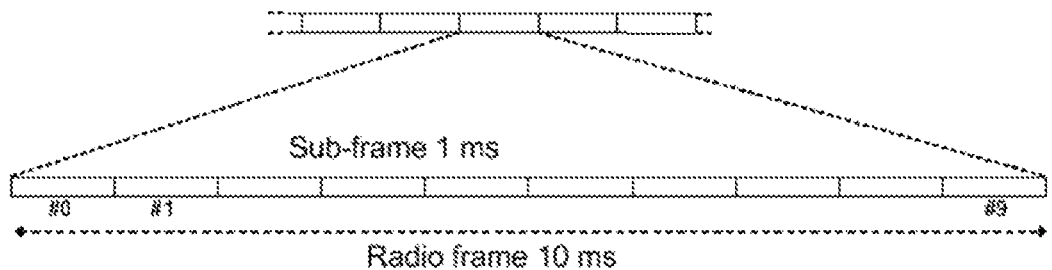
FIG. 2 illustrates the LTE time-domain structure.
Figure 3:
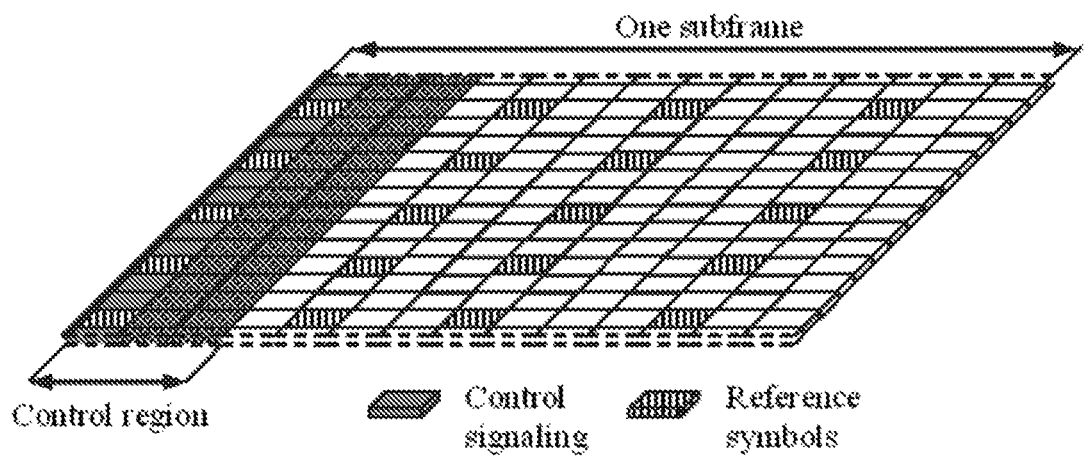
FIG. 3 illustrates a downlink system with 3 orthogonal frequency division multiplexing (OFDM) symbols as control for LTE.
Figure 4:
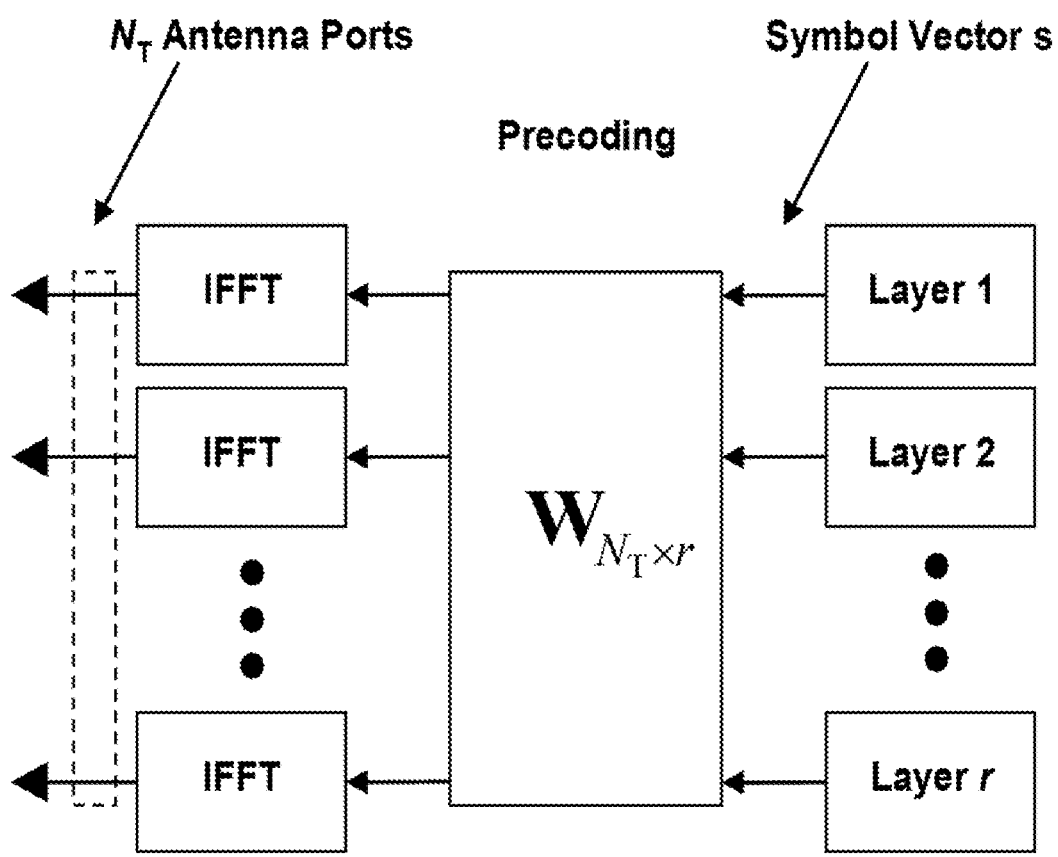
FIG. 4 illustrates an example spatial multiplexing operation.
Figure 5A:
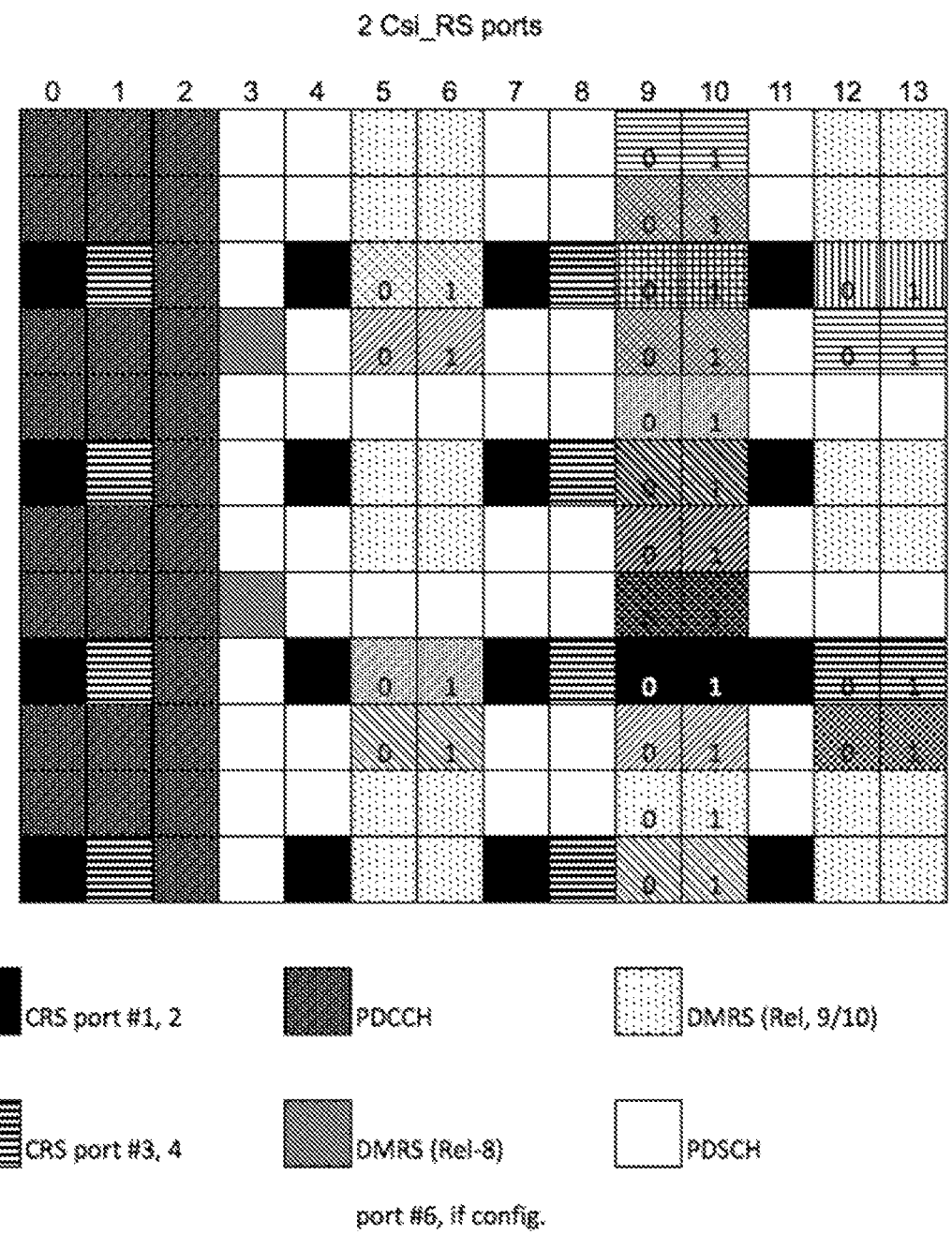
FIGS. 5A-5C illustrate resource element grids.
Figure 5B:
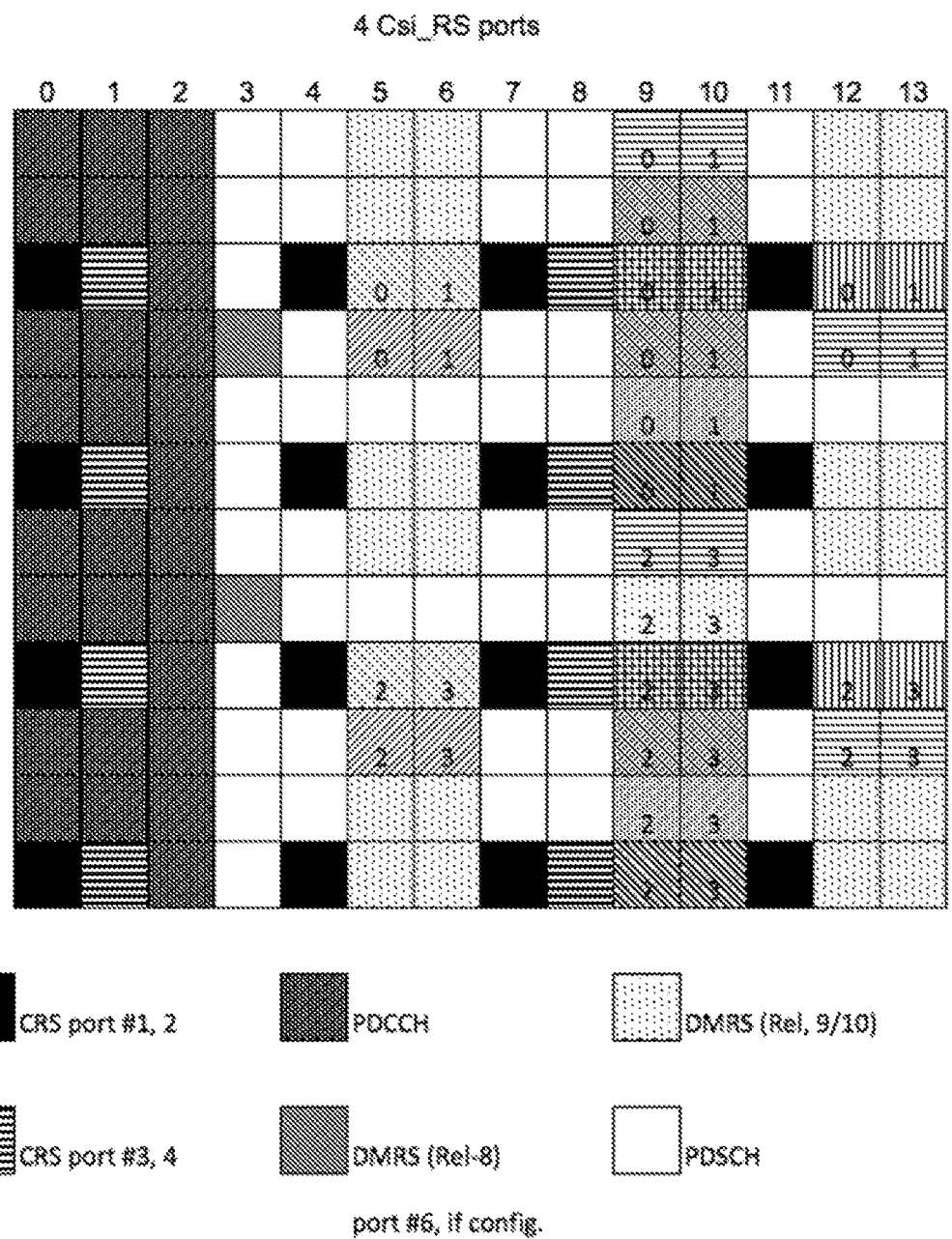
Figure 5C:
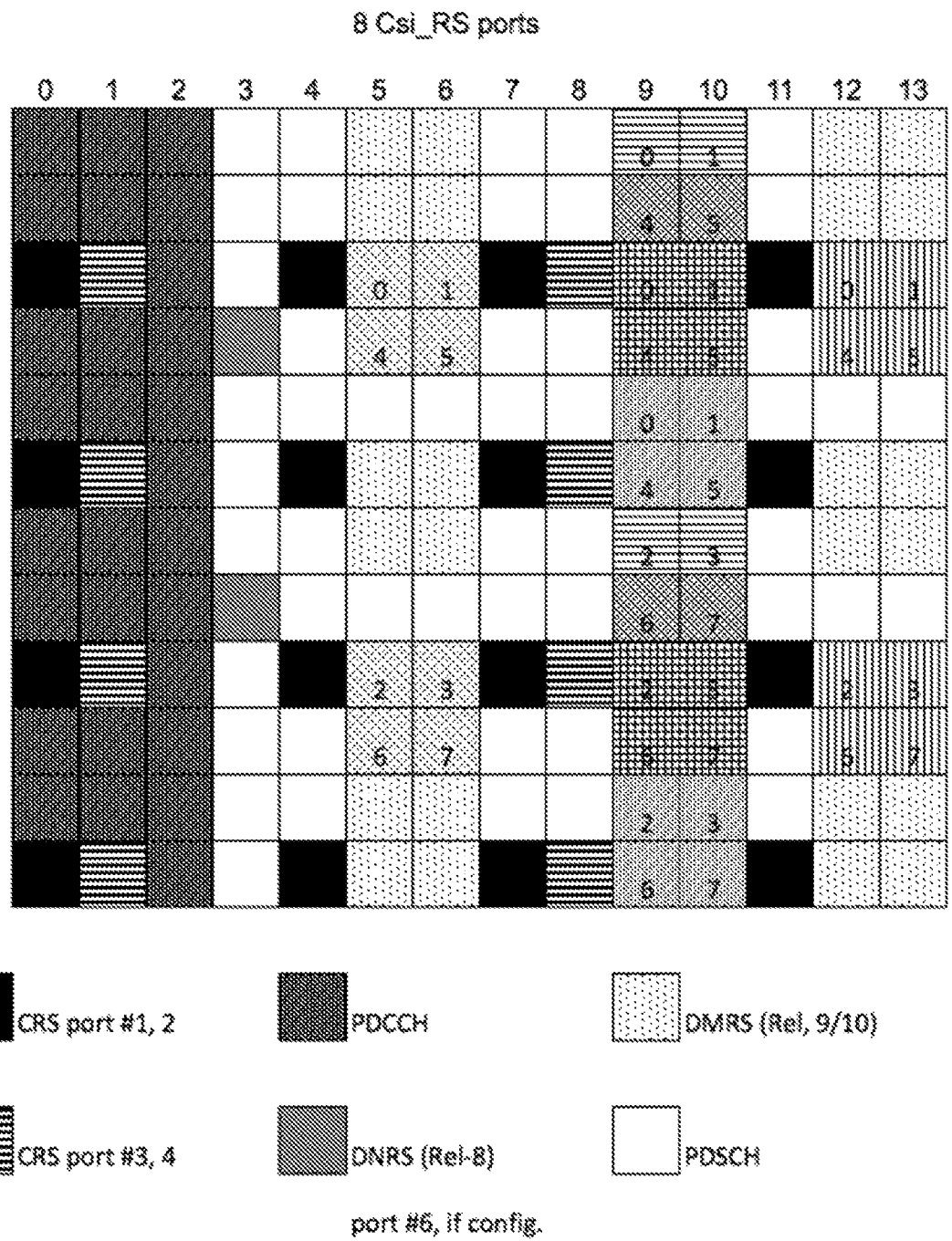
Figure 6:
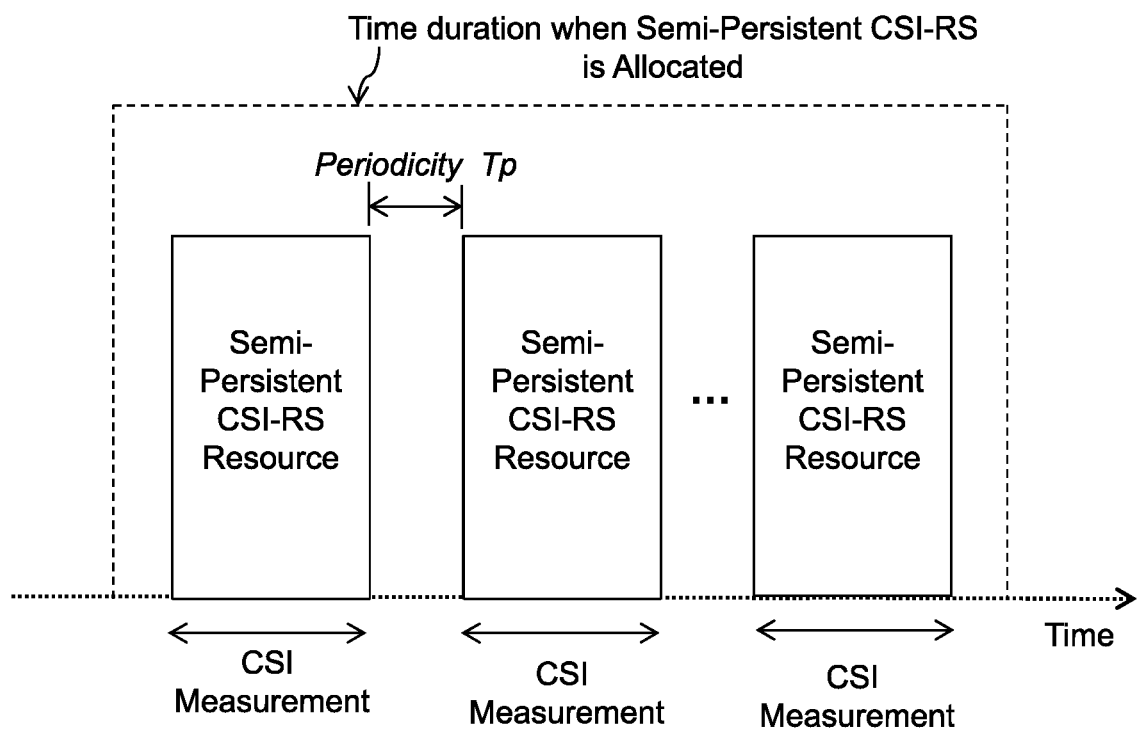
FIG. 6 illustrates semi-persistent channel state information reference signal (CSI-RS) transmitted for a limited time duration.
Figure 7:
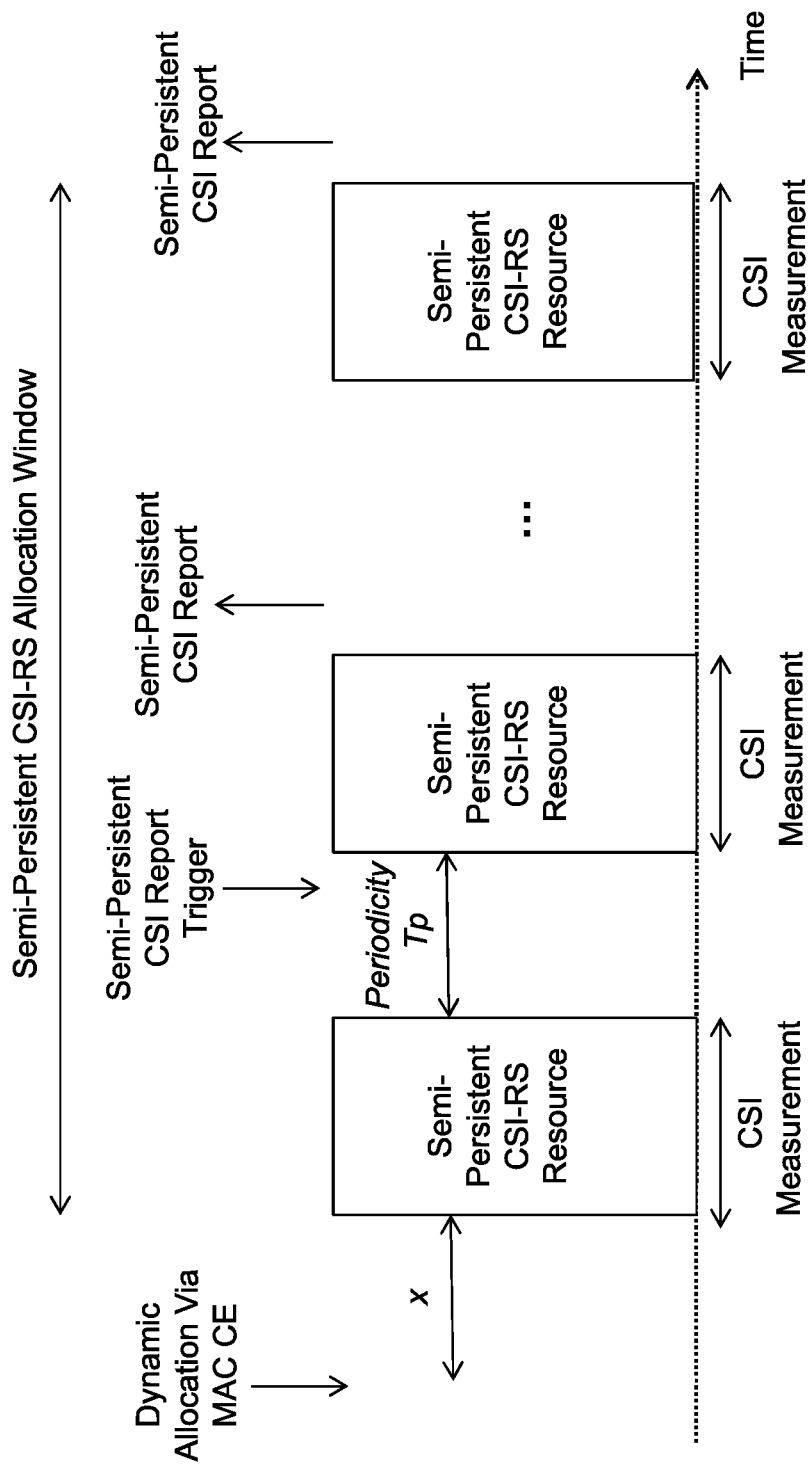
FIG. 7 illustrates an example of medium access control control element (MAC CE) based dynamic allocation signaling for beginning semi-persistent CSI-RS transmission.
Figure 8:
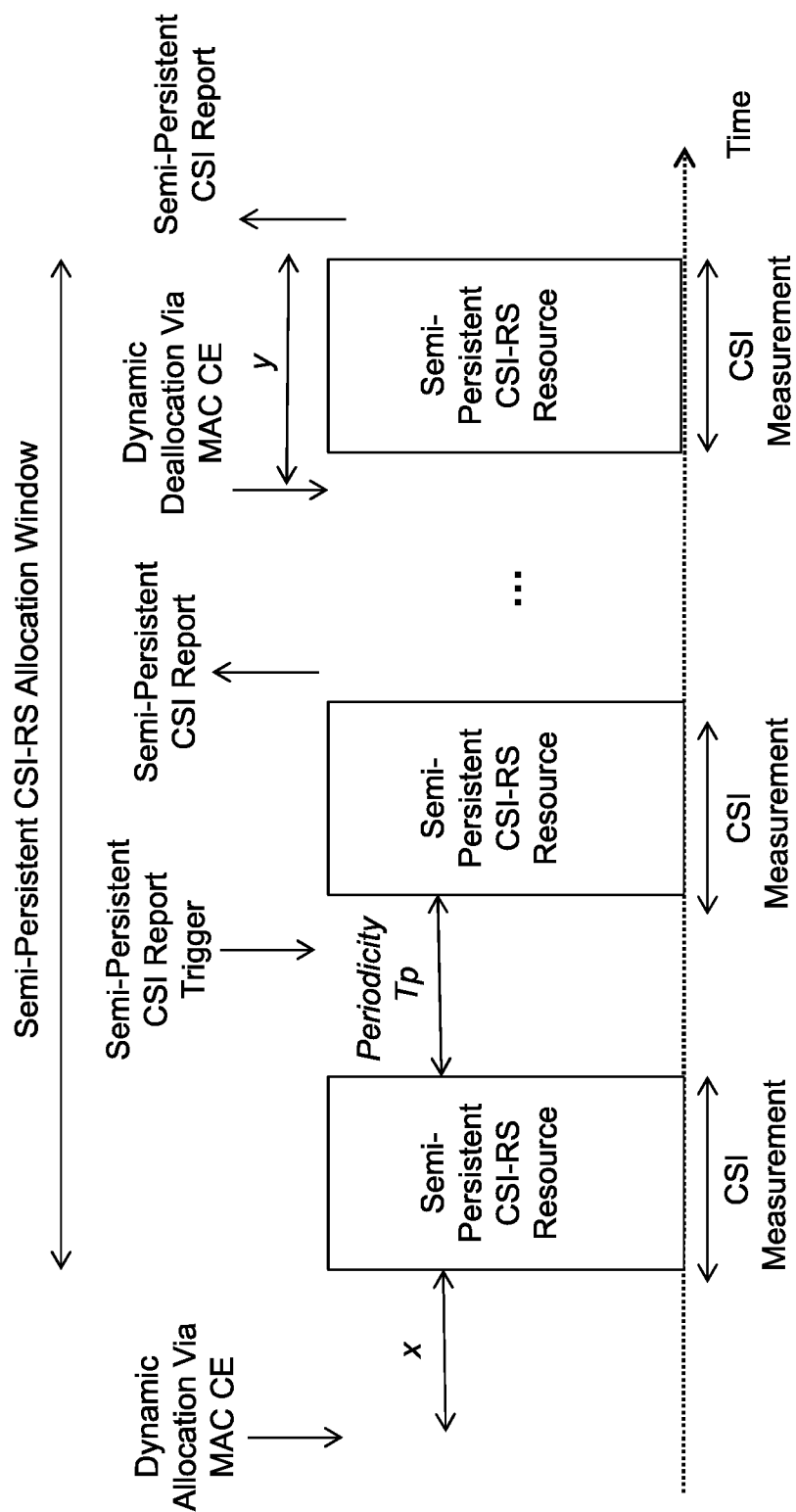
FIG. 8 illustrates an example of MAC CE based dynamic deallocation signaling for stopping semi-persistent CSI-RS transmission.
Figure 9:
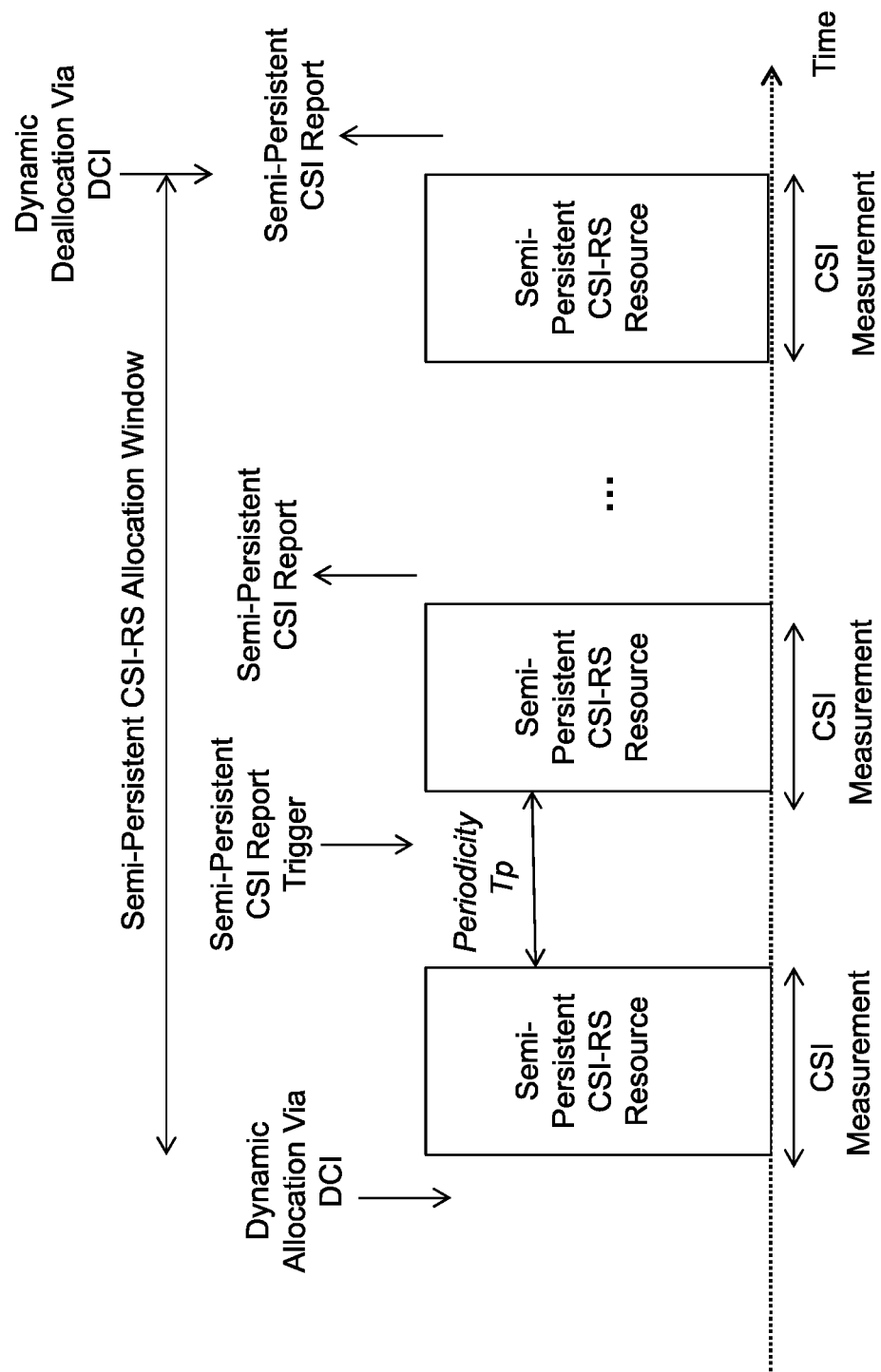
FIG. 9 illustrates the problems for the combination of semi-persistent CSI-RS measurement with semi-persistent channel state information (CSI) reporting.

Particular embodiments of the present disclosure may provide solutions reliable dynamic indication for semi-persistent channel state information reference signal (CSI-RS). Specifically, certain embodiments may provide reliable downlink control information (DCI) based dynamic allocation/deallocation for semi-persistent CSI-RS measurements. In some such embodiments, semi-persistent CSI-RS measurements in the wireless device is initiated with dynamic DCI based allocation signaling. To ensure reliability, in one embodiment, after a wireless device receives the DCI based dynamic allocation of semi-persistent CSI-RS from the gNodeB (gNB), the wireless device measures the first instance of the semi-persistent CSI-RS and the wireless device sends a first aperiodic channel state information (CSI) report based on the first measurement to the gNB. By contrast, according to previous reporting systems, a wireless device configured to have Aperiodic CSI reporting would begin measurements in response to successfully receiving a semi-persistent allocation but not transmit the CSI report until it receives an Aperiodic CSI trigger. According to embodiments described herein, however, the first aperiodic CSI report is triggered by the semi-persistent CSI-RS allocation trigger. The gNB can use this first aperiodic CSI report to verify that the UE received the dynamic allocation DCI indication successfully.

According to certain other embodiments, a separate aperiodic CSI measurement report trigger may be sent from gNB to the wireless device after the semi-persistent CSI-RS measurement trigger so that the gNB can use the CSI report to verify the successful reception of the semi-persistent CSI-RS trigger by the wireless device.

According to still another embodiment, semi-persistent CSI reporting may be triggered in the wireless device by the gNB simultaneously with the same DCI as the semi-persistent CSI-RS measurement, then the gNB can use the semi-persistent CSI reports to verify whether the UE has received the trigger correctly.

Accordingly, in an example embodiment, to ensure reliability of DCI based dynamic deallocation to stop semi-persistent CSI-RS measurements, a mechanism is used where after receiving the DCI based dynamic deallocation of semi-persistent CSI-RS from the gNB, the wireless device stops measuring semi-persistent CSI-RS. If the wireless device received the DCI based dynamic deallocation indication successfully, the wireless device may not send further semi-persistent CSI reports after DCI based dynamic deallocation indication (i.e., since semi-persistent CSI-RS measurements have been stopped by the DCI based dynamic deallocation indication). Thus, not receiving further semi-persistent CSI reports can be used by the gNB to verify that the wireless device received the dynamic deallocation DCI indication successfully. Alternatively stated, from the gNB perspective, receiving further semi-persistent CSI reports after DCI based dynamic deallocation indication is a negative acknowledgement that the dynamic deallocation DCI indication was received successfully. The gNB may then react by initiating a retransmission of the deallocation indication.

Figure 10:
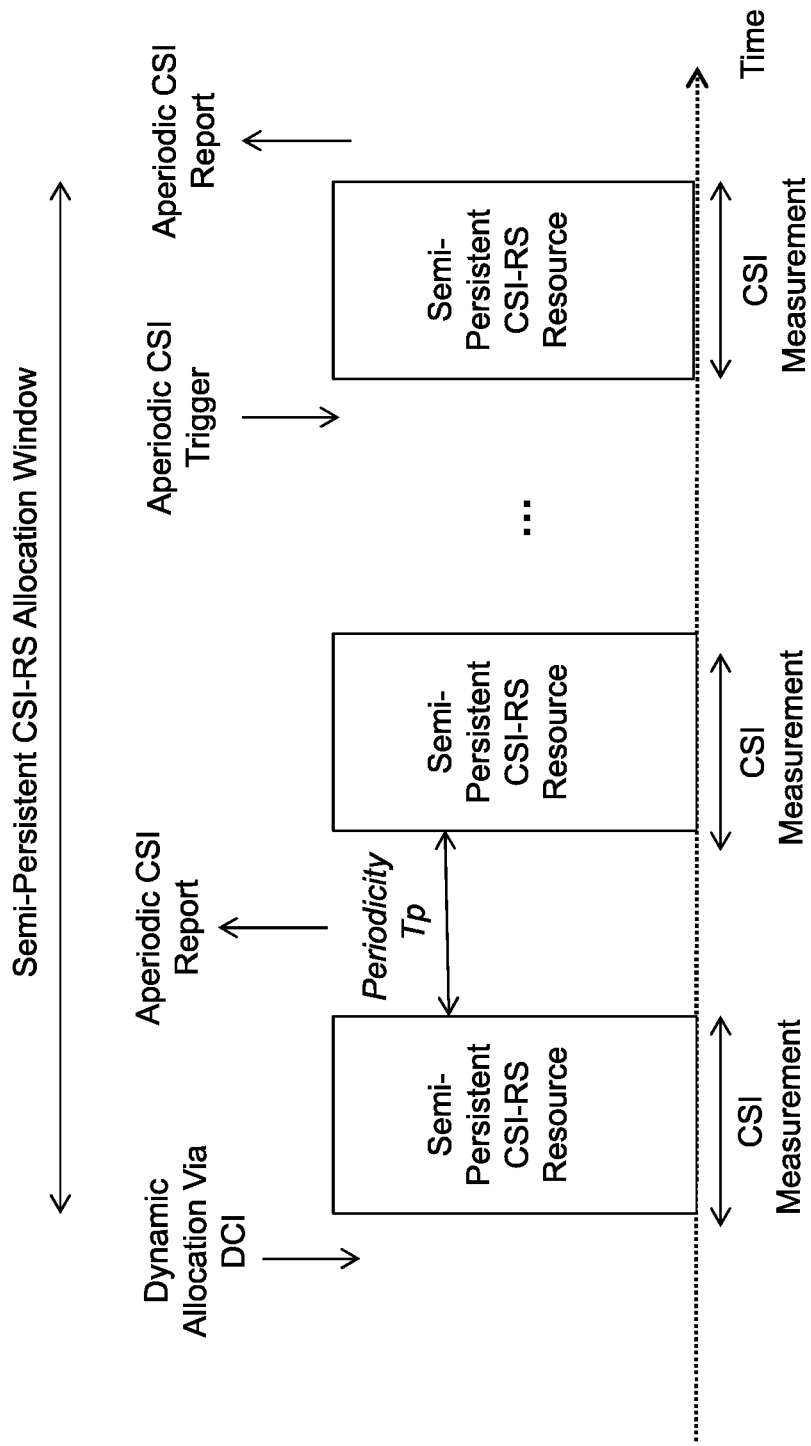
FIG. 10 illustrates example reliable downlink control information (DCI) based dynamic allocation for semi-persistent CSI-RS with aperiodic CSI reporting, according to certain embodiments.

Particular embodiments are described in FIGS. 10-21 of the drawings, like numerals being used for like and corresponding parts of the various drawings. FIG. 10 illustrates example reliable DCI based dynamic allocation for semi-persistent CSI-RS with aperiodic CSI reporting, according to certain embodiments. Specifically, to ensure reliability of DCI based dynamic allocation to start measurement in the wireless device on semi-persistent CSI-RS, and possibly also to start CSI-RS transmissions from gNB, a mechanism is used. Note that triggering a measurement in the wireless device does not necessarily imply that a CSI-RS transmission is initiated, the CSI-RS may be present in earlier slots as well, used for measurements by other served wireless device. Thus, when describing triggering of a measurement in the wireless device, it could mean that gNB starts transmitting the corresponding CSI-RS or it could mean that gNB simply continues to transmit that CSI-RS if that CSI-RS has been initiated earlier. In this mechanism, gNB sends a DCI (possibly over physical downlink control channel (PDCCH)) with an indication of starting a semi-persistent CSI-RS measurement. The indication may be included in an uplink data grant. In some cases, the first CSI-RS measurement (and thus a CSI-RS transmission) may occur in the same subframe or slot as the PDCCH. After receiving the DCI based dynamic allocation of semi-persistent CSI-RS from the gNB, the wireless device measures the first instance of the semi-persistent CSI-RS transmission and sends a first aperiodic CSI report based on the first measurement to the gNB over the uplink resources allocated in the uplink data grant. The gNB may use this first aperiodic CSI report to verify that the wireless device received the dynamic allocation DCI indication successfully. If the gNB does not receive the aperiodic CSI report nor has a CSI decoding error after sending the dynamic allocation via DCI, then the gNB assumes that the wireless device has not received the dynamic DCI allocation successfully and retransmits the dynamic DCI allocation to the wireless device.

If the first aperiodic CSI report is received correctly and the DCI based dynamic allocation signal is deemed successfully received by the wireless device, then the gNB transmission and wireless device measurements of semi-persistent CSI-RS continues with preconfigured periodicity as shown in FIG. 10. Thus, as shown in FIG. 10, only the first aperiodic CSI report is triggered by the DCI based dynamic allocation signal, and separate aperiodic CSI triggers will trigger subsequent aperiodic CSI reports. That is, the DCI based dynamic allocation signals both the start of the semi-persistent CSI-RS measurement and also a request for the first aperiodic CSI report.

Figure 11:
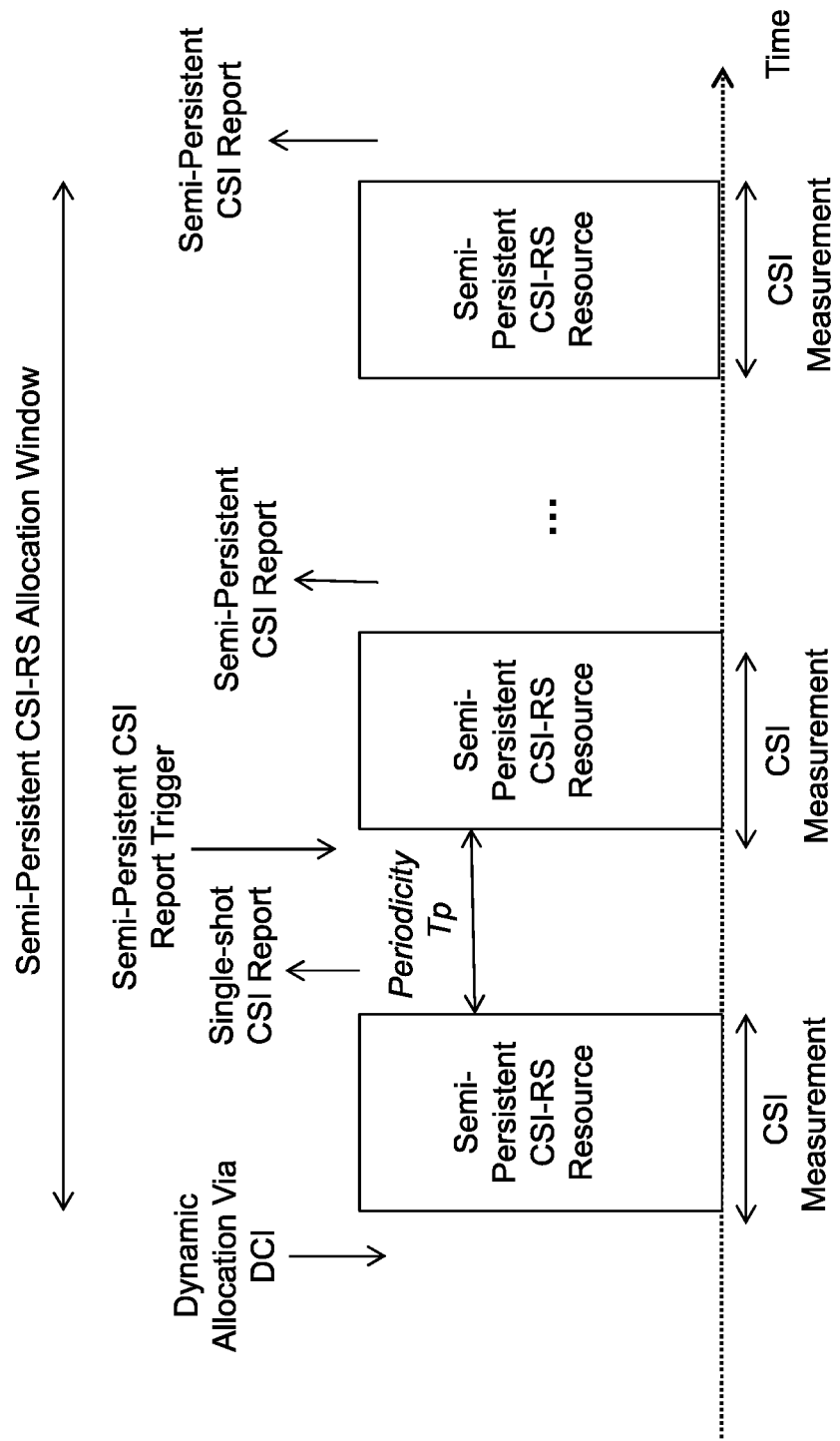
FIG. 11 illustrates example reliable DCI based dynamic allocation for semi-persistent CSI-RS with semi-persistent CSI reporting, according to certain embodiments.

The DCI used for the dynamic allocation includes as least some of the following fields:
Indication of semi-persistent CSI-RS measurement initiation
Indication of semi-persistent CSI-RS configuration index/indices
Uplink resource allocation and associated modulation and coding rate In certain other embodiments, the semi-persistent CSI-RS measurement (and possible initiation of the transmission from gNB if the CSI-RS not already being transmitted) is combined with semi-persistent CSI reporting. FIG. 11 illustrates reliable DCI based dynamic allocation where semi-persistent CSI-RS measurement and the semi-persistent CSI report are triggered by different DCI indications. In this case, to ensure reliability of DCI based dynamic allocation to start semi-persistent CSI-RS measurement, a single-shot CSI report that follows immediately after the first instance of the semi-persistent CSI-RS measurement can be used by the gNB to verify that the wireless device received the dynamic allocation DCI successfully. This single-shot CSI report captures the wireless device's measurement of the first instance of the semi-persistent CSI-RS transmission. If the gNB does not receive the single-shot CSI report after sending the dynamic allocation via DCI, then the gNB assumes that the wireless device has not received the dynamic DCI allocation successfully and retransmits the dynamic DCI allocation to the wireless device. As shown in FIG. 11, only the single-shot CSI report is triggered by the DCI based dynamic allocation signal, and a separate semi-persistent CSI trigger initiates the semi-persistent CSI reports. That is, the DCI based dynamic allocation signal both starts the semi-persistent CSI-RS measurements (and possibly initiate the gNB transmission of CSI-RS) and also triggers the single-shot CSI report.

In still another embodiment, semi-persistent CSI-RS measurement and semi-persistent CSI reporting may be triggered or activated using a single DCI. In this case, semi-persistent CSI-RS measurement is triggered by the DCI in the same way as in embodiments 2 and 3. However, semi-persistent CSI reporting is also activated by the same DCI. For example, when a wireless device receives the DCI, it assumes that a semi-persistent CSI-RS transmission starts in the same subframe or slot as the one over which the DCI is received and the UE starts measuring CSI based on the configured CSI-RS and reports CSI periodically according the configured reporting periodicity and subframe or slot offsets. If the gNB receives CSI at the configured subframes or slots successfully from the wireless device, then the semi-persistent CSI-RS measurement is initiated successfully, otherwise if the gNB did not detect the expected CSI reports successfully, then the initiation is not successful and another DCI would be sent to the UE to initiate semi-persistent CSI-RS measurements.

Figure 12:
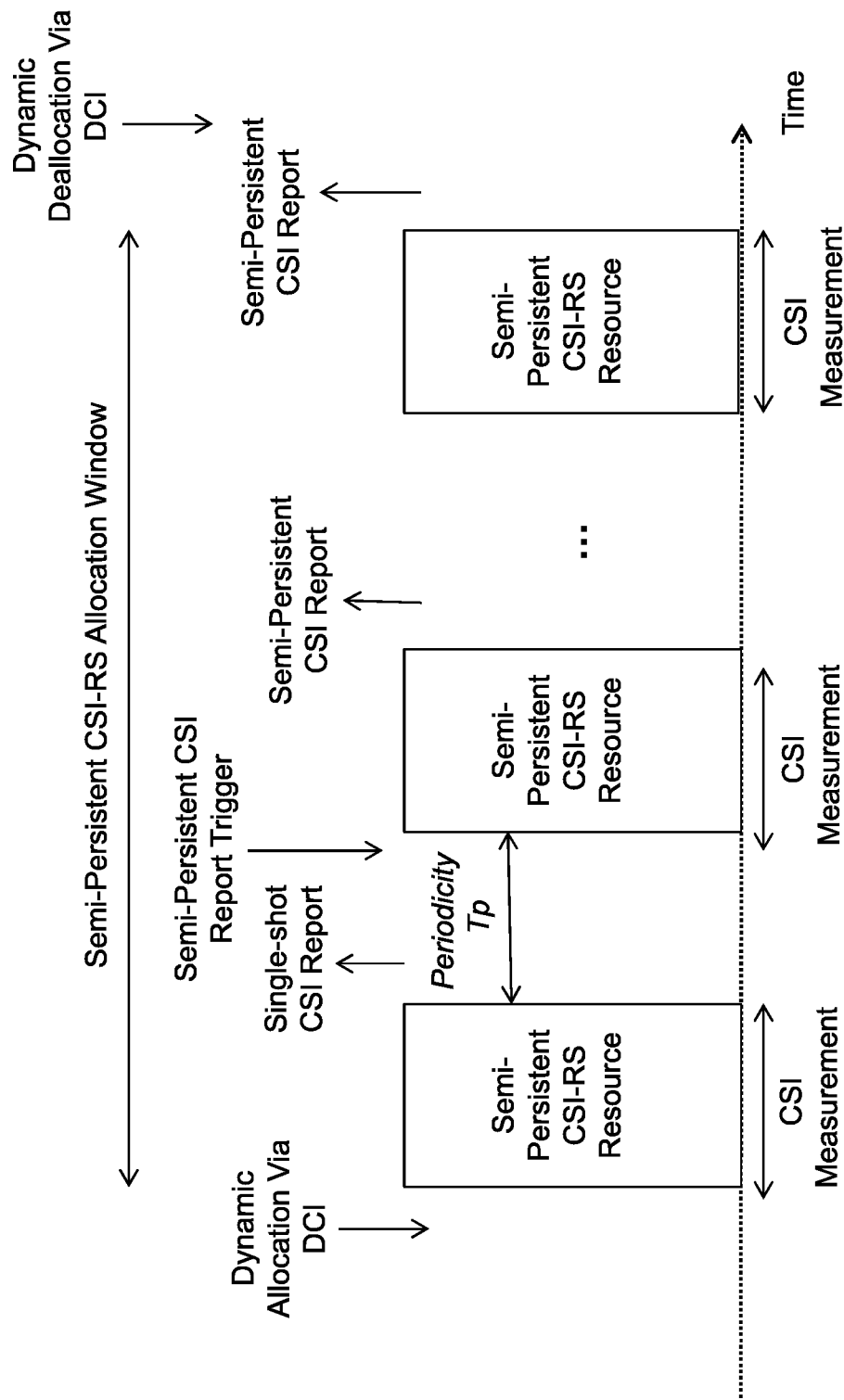
FIG. 12 illustrates example reliable DCI based dynamic deallocation for semi-persistent CSI-RS with semi-persistent CSI reporting, according to certain embodiments.

Mechanisms may also be used to ensure reliability of DCI based dynamic deallocation to stop semi-persistent CSI-RS measurements (and possibly also to stop CSI-RS transmissions from the gNB in case no other wireless device is measuring on this CSI-RS). FIG. 12 illustrates reliable DCI based dynamic deallocation for semi-persistent CSI-RS with semi-persistent CSI reporting. According to the depicted embodiment, after receiving the DCI based dynamic deallocation of semi-persistent CSI-RS from the gNB, the wireless device assumes that the semi-persistent CSI-RS transmission has been stopped after the subframe or slot over which the DCI is received and, thus, stops measuring semi-persistent CSI-RS. If the wireless device received the DCI based dynamic deallocation indication successfully, the wireless device will not send further semi-persistent CSI reports after DCI based dynamic deallocation indication (i.e., since semi-persistent CSI-RS transmissions have been stopped by the DCI based dynamic deallocation indication). As such, not receiving further semi-persistent CSI reports can be used by the gNB to verify that the wireless device received the dynamic deallocation DCI indication successfully. Alternatively stated, from the gNB perspective, receiving further semi-persistent CSI reports after DCI based dynamic deallocation indication is a negative acknowledgement that the dynamic deallocation DCI indication was received successfully. If the gNB does receive further semi-persistent CSI reports after sending the dynamic deallocation via DCI, then the gNB assumes that the wireless device has not received the dynamic DCI deallocation successfully and retransmits the dynamic DCI deallocation to the wireless device. Both "not receiving further semi-persistent CSI reports" and "receive further semi-persistent CSI reports" can be indicated by whether CSI reports are decoded correctly or incorrectly. Multiple report instances may be monitored to ensure detection reliability.

Figure 13:
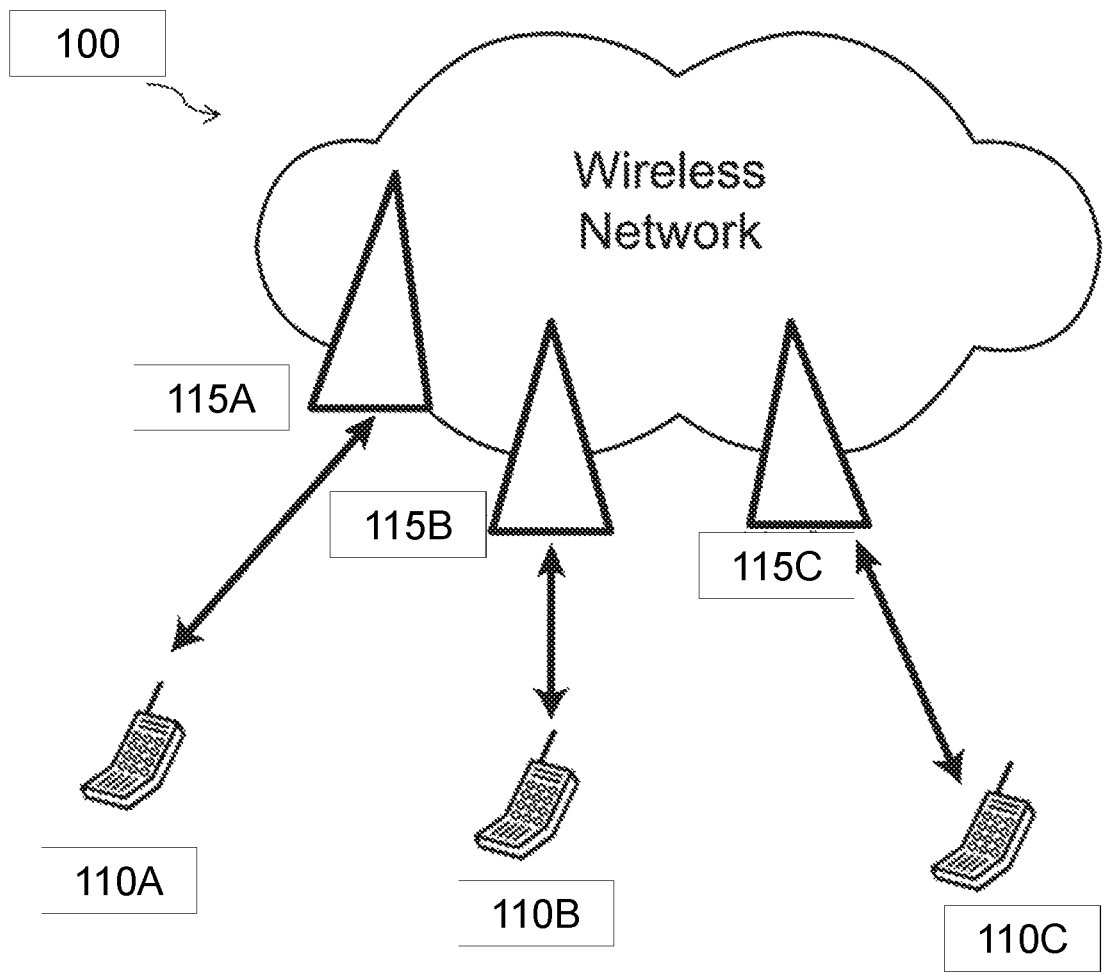
FIG. 13 illustrates an example network for reliable dynamic indication for semi-persistent CSI-RS, according to certain embodiments.

FIG. 13 is a block diagram illustrating an embodiment of a wireless network 100 for reliable dynamic indication for semi-persistent CSI-RS, in accordance with certain embodiments. Network 100 includes one or more wireless devices 110A-C, which may be interchangeably referred to as wireless devices 110 or UEs 110, and network nodes 115A-C, which may be interchangeably referred to as network nodes 115 or eNodeBs 115. A wireless device 110 may communicate with network nodes 115 over a wireless interface. For example, wireless device 110A may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell. In some embodiments, wireless devices 110 may have device to device (D2D) capability. Thus, wireless devices 110 may be able to receive signals from and/or transmit signals directly to another wireless device 110. For example, wireless device 110A may be able to receive signals from and/or transmit signals to wireless device 110B.

In certain embodiments, network nodes 115 may interface with a radio network controller (not depicted in FIG. 13). The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 110. Wireless devices 110 may exchange certain signals with the core network node using the non-access stratum layer. In non-access stratum signaling, signals between wireless devices 110 and the core network node may be transparently passed through the radio access network. In certain embodiments, network nodes 115 may interface with one or more network nodes over an internode interface. For example, network nodes 115A and 115B may interface over an X2 interface.

As described above, example embodiments of network 100 may include one or more wireless devices 110, and one or more different types of network nodes capable of communicating (directly or indirectly) with wireless devices 110. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Also, in some embodiments, generic terminology, "radio network node" (or simply "network node") is used. It can be any kind of network node, which may comprise a Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC), MDT, or any suitable network node. Example embodiments of wireless devices 110, network nodes 115, and other network nodes (such as radio network controller or core network node) are described in more detail with respect to FIGS. 14, 18, and 21, respectively.

Although FIG. 13 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between wireless devices or between a wireless device and another communication device (such as a landline telephone). Furthermore, although certain embodiments may be described as implemented in a LTE network, the embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). For example, the various embodiments described herein may be applicable to LTE, LTE-Advanced, LTE-U Universal Mobile Telecommunications System (UMTS), High Speed Packet Access (HSPA), Global System for Mobile Communications (GSM), cdma2000, WiMax, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink and vice versa.

The techniques described herein are applicable to both Licensed Assisted Access (LAA) LTE and standalone LTE operation in license-exempt channels. The described techniques are generally applicable for transmissions from both network nodes 115 and wireless devices 110.

Figure 14:
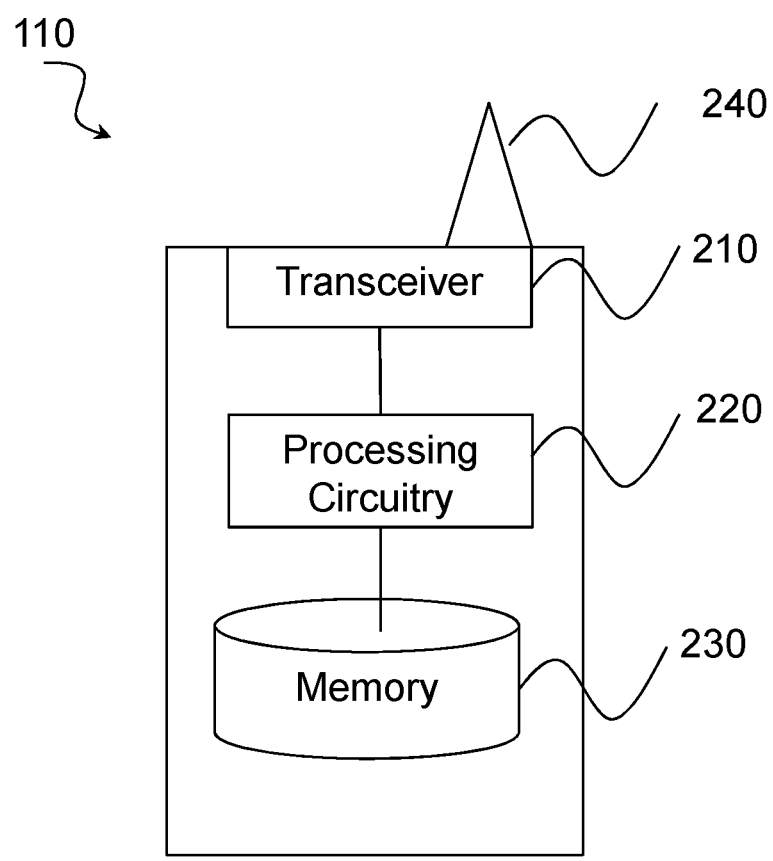
FIG. 14 illustrates an example wireless device for facilitating reliable dynamic indication for semi-persistent CSI-RS, according to certain embodiments.

FIG. 14 illustrates an example wireless device 110 reliable dynamic indication for semi-persistent CSI-RS, in accordance with certain embodiments. As depicted, wireless device 210 includes transceiver 210, processing circuitry 220, and memory 230. In some embodiments, transceiver 210 facilitates transmitting wireless signals to and receiving wireless signals from network node 115 (e.g., via an antenna 240), processing circuitry 220 executes instructions to provide some or all of the functionality described above as being provided by wireless device 110, and memory 230 stores the instructions executed by processing circuitry 220. Examples of a wireless device 110 are provided above.

Processing circuitry 220 may include any suitable combination of hardware and software implemented in one or more modules to execute instructions and manipulate data to perform some or all of the described functions of wireless device 110. In some embodiments, processing circuitry 220 may include, for example, one or more computers, one or more central processing units (CPUs), one or more processors, one or more microprocessors, one or more applications, and/or other logic.

Memory 230 is generally operable to store instructions, such as a computer program, software, an application including one or more of logic, rules, algorithms, code, tables, etc. and/or other instructions capable of being executed by processing circuitry. Examples of memory 230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 14 that may be responsible for providing certain aspects of the wireless device's functionality, including any of the functionality described above and/or any additional functionality (including any functionality necessary to support the solution described above).

Figure 15:
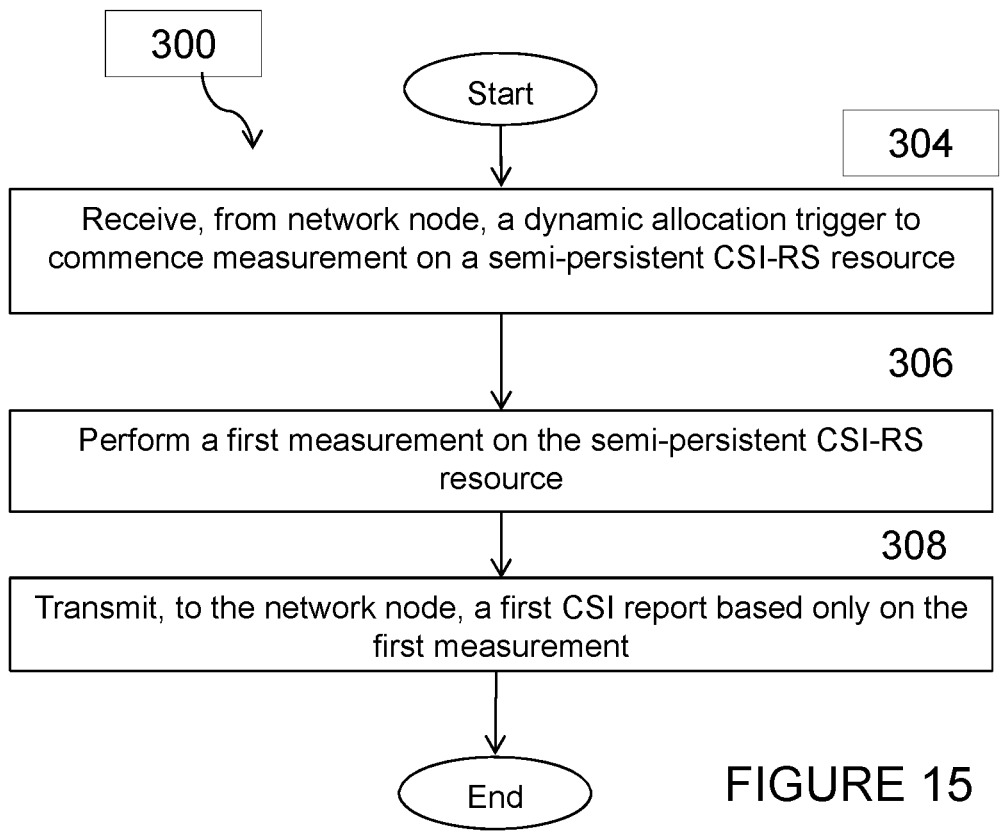
FIG. 15 illustrates an example method for initiating semi-persistent CSI measurements on a CSI-RS resource configured by higher layers, according to certain embodiments.

FIG. 15 illustrates an example method by a wireless device 110 for initiating semi-persistent CSI measurements on a CSI-RS resource configured by higher layers, according to certain embodiments. The method begins at step 304 when wireless device 110 receives, from network node 115, a dynamic allocation trigger to commence measurement of a semi-persistent CSI-RS resource. At step 306, a first measurement of the CSI-RS resource is performed. At step 308, a first CSI report based only on the first measurement is transmitted to the network node 115.

Figure 16:
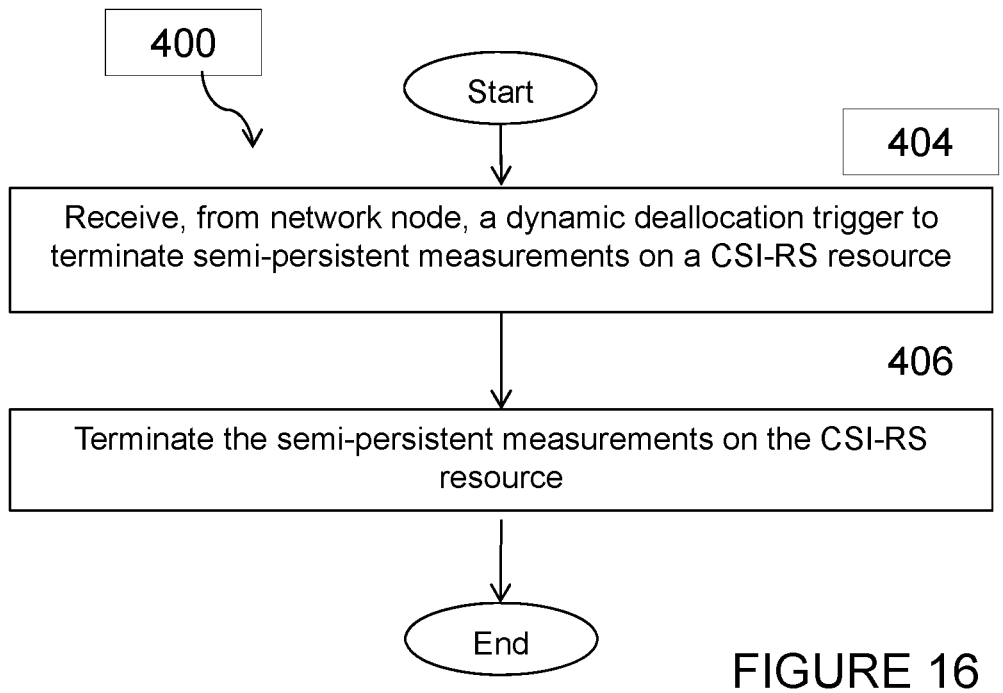
FIG. 16 illustrates an example method for terminating semi-persistent CSI measurements on a CSI-RS resource configured by higher layers, according to certain embodiments.

FIG. 16 illustrates an example method a wireless device 110 for terminating semi-persistent CSI measurements on a CSI-RS resource configured by higher layers, according to certain embodiments. The method begins at step 404 when wireless device 110 receives, from a network node, a dynamic deallocation trigger to terminate semi-persistent measurements on a CSI-RS resource. At step 406, wireless device 110 terminates the semi-persistent measurements on the CSI-RS resource.

Figure 17:
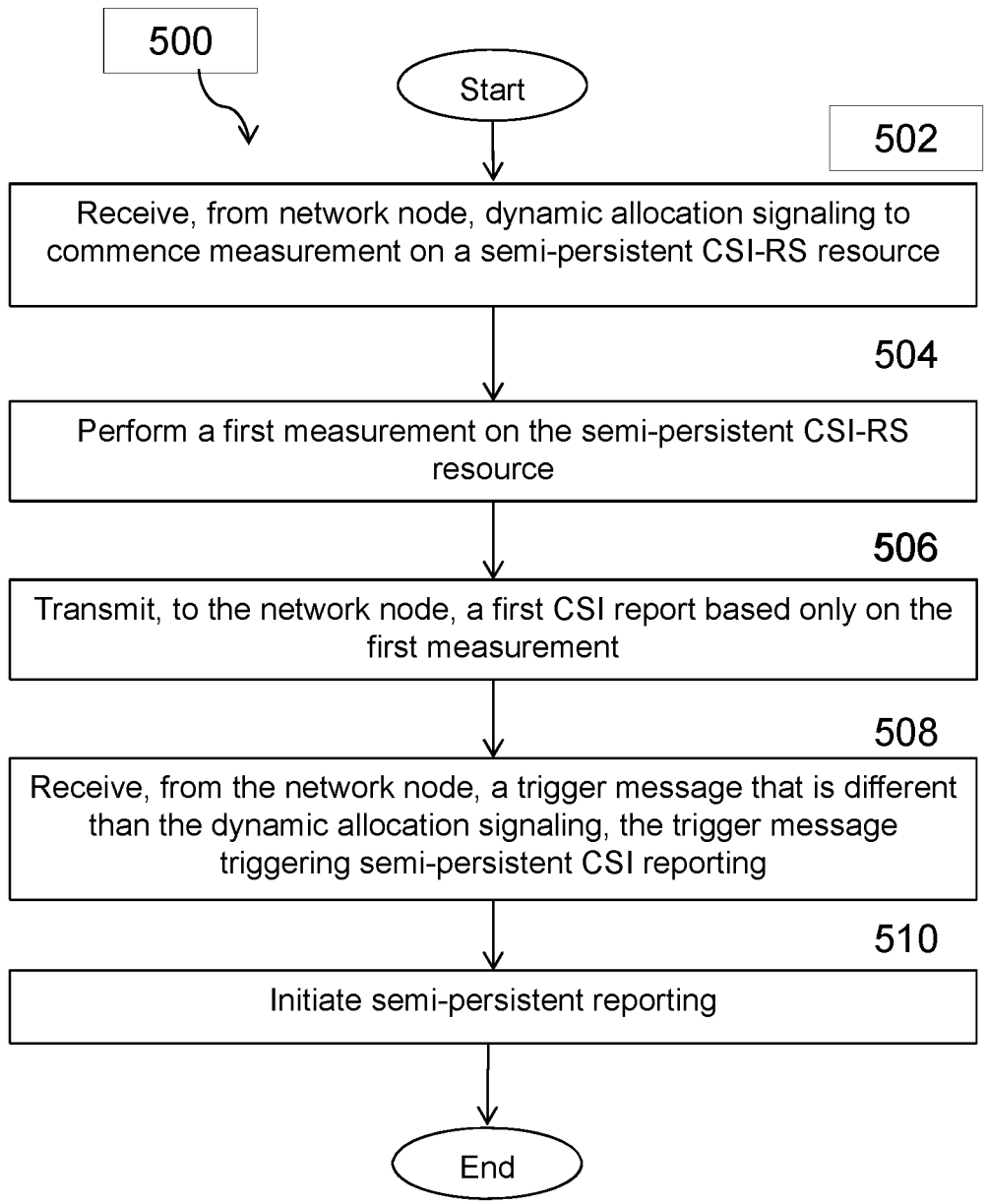
FIG. 17 illustrates an example method by a wireless device for facilitating reliable dynamic indication for semi-persistent CSI-RS, according to certain embodiments.

FIG. 17 illustrates an example method by a wireless device 110, according to certain embodiments. The method begins at step 502 when wireless device 110 receives, from a network node 115, dynamic allocation signaling to commence measurement on a semi-persistent CSI-RS resource. According to certain embodiments, the semi-persistent CSI-RS resource includes a CSI-RS resource that is configured with at least a CSI-RS transmission periodicity and for which at least one UE assumption on transmission and cessation of CSI-RS transmission applies. As another example, the semi-persistent CSI-RS resource may be configured for transmission of CSI-RS at a configured periodicity for a limited time duration and receipt of the dynamic allocation may be required to trigger to transmission of the semi-persistent CSI-RS on the semi-persistent CSI-RS resource.

According to certain embodiments, the dynamic allocation signaling initiates semi-persistent CSI measurements on the CSI-RS resource and also trigger the first CSI report. In a particular embodiment, the dynamic allocation signaling includes at least one of an indication of semi-persistent CSI-RS measurement initiation, an indication of semi-persistent CSI-RS resource configuration index/indices, and an uplink resource allocation and associated modulation and coding rate. In a particular embodiment, the dynamic allocation signaling comprises a MAC CE.

At step 504, wireless device 110 performs a first measurement on the semi-persistent CSI-RS resource. Wireless device 110 transmits, to the network node 115, a first CSI report based only on the first measurement at step 506. In a particular embodiment, the first CSI report is an aperiodic report. In another embodiment, the first CSI report is a semi-persistent report.

At step 508, wireless device 110 receives, from the network node 115, a trigger message that is different than the dynamic allocation signaling of step 502. According to certain embodiments, the trigger message triggers semi-persistent CSI reporting. According to a particular embodiment, for example, the trigger message includes DCI.

At step 510, wireless device 110 initiates semi-persistent reporting in response to the trigger message. According to a particular embodiment, wireless device 110 may transmit a plurality of semi-persistent CSI reports.

According to a particular embodiment, wireless device 110 may cease transmission of the semi-persistent CSI-RS reports after a predetermined length of time. In other embodiments, wireless device 110 may receive dynamic deallocation signaling to terminate the measurement of on the semi-persistent CSI-RS resource and cease the semi-persistent measurements on the semi-persistent CSI-RS resource in response to the dynamic deallocation trigger.

Figure 18:
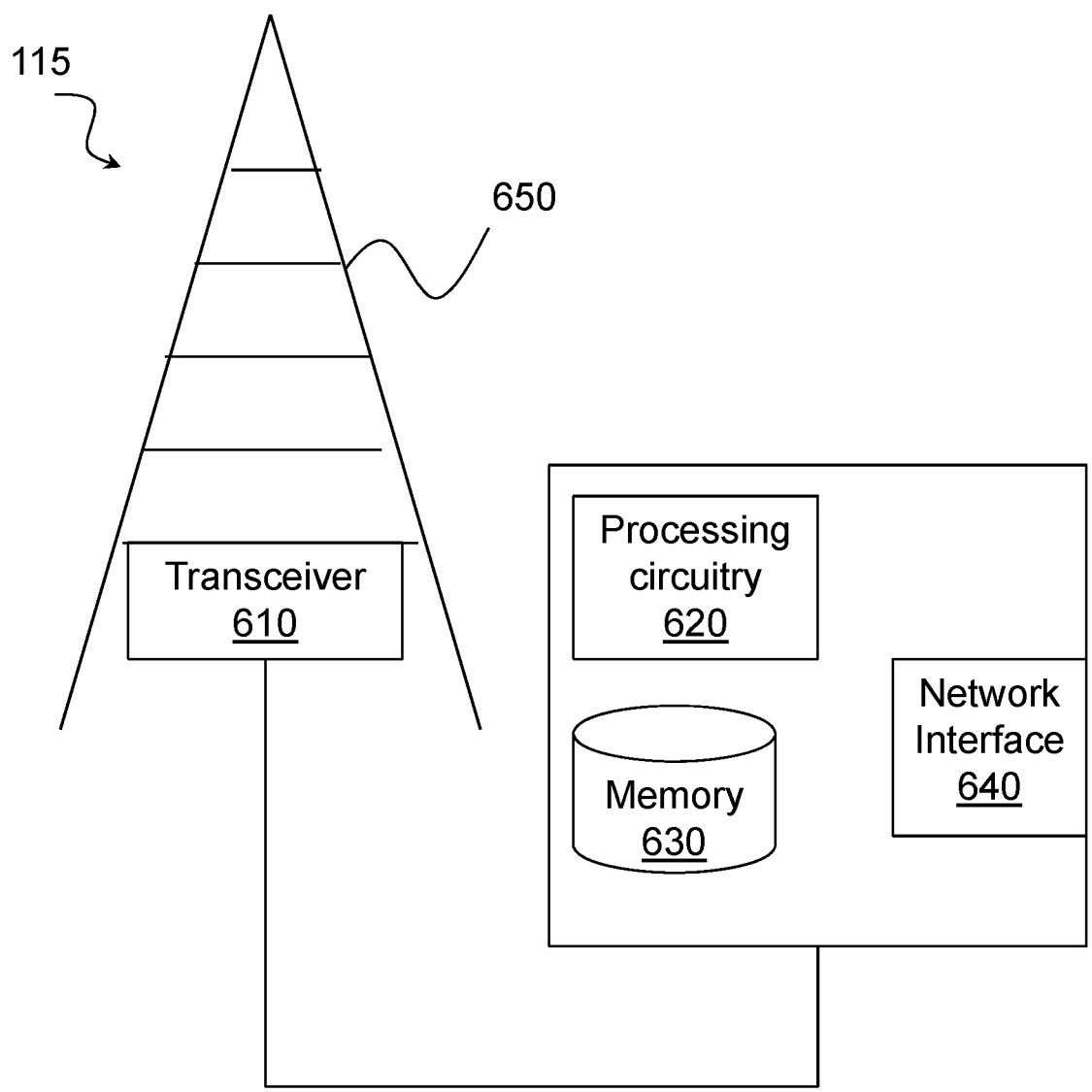
FIG. 18 illustrate an example network node for reliable dynamic indication for semi-persistent CSI-RS, according to certain embodiments.

FIG. 18 illustrate an example network node 115 for reliable dynamic indication for semi-persistent CSI-RS, according to certain embodiments. As described above, network node 115 may be any type of radio network node or any network node that communicates with a wireless device and/or with another network node. Examples of a network node 115 are provided above.

Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 610, processing circuitry 620, memory 630, and network interface 640. In some embodiments, transceiver 610 facilitates transmitting wireless signals to and receiving wireless signals from wireless device 110 (e.g., via an antenna 650), processing circuitry 620 executes instructions to provide some or all of the functionality described above as being provided by a network node 115, memory 630 stores the instructions executed by processing circuitry 620, and network interface 640 communicates signals to backend network components, such as a gateway, switch, router, Internet, Public Switched Telephone Network (PSTN), core network nodes or radio network controllers, etc.

In certain embodiments, network node 115 may be capable of using multi-antenna techniques, and may be equipped with multiple antennas and capable of supporting MIMO techniques. The one or more antennas may have controllable polarization. In other words, each element may have two co-located sub elements with different polarizations (e.g., 90 degree separation as in cross-polarization), so that different sets of beamforming weights will give the emitted wave different polarization.

Processing circuitry 620 may include any suitable combination of hardware and software implemented in one or more modules to execute instructions and manipulate data to perform some or all of the described functions of network node 115. In some embodiments, processing circuitry 620 may include, for example, one or more computers, one or more central processing units (CPUs), one or more microprocessors, one or more applications, and/or other logic.

Memory 630 is generally operable to store instructions, such as a computer program, software, an application including one or more of logic, rules, algorithms, code, tables, etc. and/or other instructions capable of being executed by a processor. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 640 is communicatively coupled to processing circuitry 620 and may refer to any suitable device operable to receive input for network node 115, send output from network node 115, perform suitable processing of the input or output or both, communicate to other devices, or any combination of the preceding. Network interface 640 may include appropriate hardware (e.g., port, modem, network interface card, etc.) and software, including protocol conversion and data processing capabilities, to communicate through a network.

Other embodiments of network node 115 may include additional components beyond those shown in FIG. 18 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components. Additionally, the terms first and second are provided for example purposes only and may be interchanged.

Figure 19:
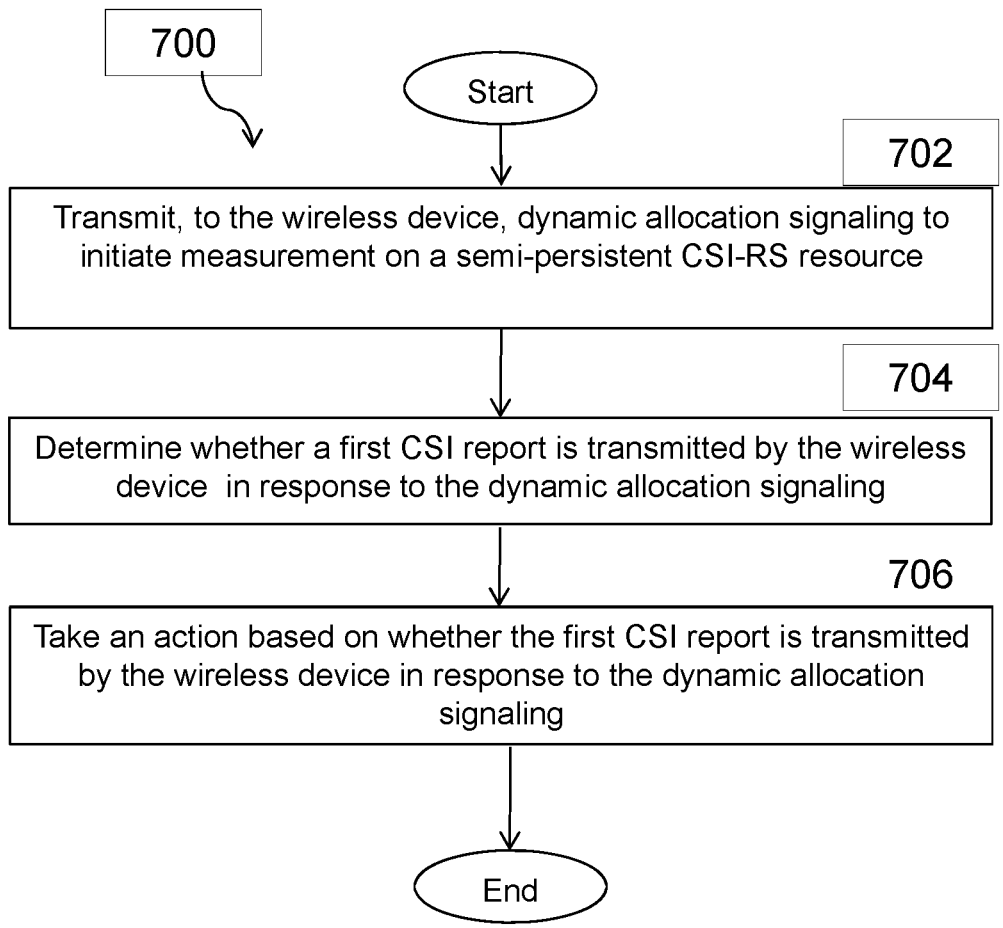
FIG. 19 illustrates an example method by a network node for initiating semi-persistent CSI measurements on a CSI-RS resource configured by higher layers, according to certain embodiments.

FIG. 19 illustrates an example method for initiating semi-persistent CSI measurements on a CSI-RS resource configured by higher layers, according to certain embodiments. The method begins at step 702 when network node 115 transmits, to the wireless device 110, dynamic allocation signaling to initiate measurement on a semi-persistent CSI-RS resource. According to certain embodiments, the semi-persistent CSI-RS resource includes a CSI-RS resource that is configured with at least a CSI-RS transmission periodicity and for which at least one UE assumption on transmission and cessation of CSI-RS transmission applies. As another example, the semi-persistent CSI-RS resource may be configured for transmission of CSI-RS at a configured periodicity for a limited time duration and receipt of the dynamic allocation may be required to trigger to transmission of the semi-persistent CSI-RS on the semi-persistent CSI-RS resource.

In a particular embodiment, the dynamic allocation signaling includes at least one of an indication of semi-persistent CSI-RS measurement initiation, an indication of semi-persistent CSI-RS resource configuration index/indices, and an uplink resource allocation and associated modulation and coding rate. In a particular embodiment, the dynamic allocation signaling comprises a MAC CE.

At step 704, it is determined whether a first CSI report is transmitted by wireless device 110 in response to the dynamic allocation signaling.

At step 706, network node 115 takes an action based on whether the first CSI report is transmitted by wireless device 110 in response to the dynamic allocation signaling.

In certain embodiments, determining whether a first CSI report is transmitted by wireless device 110 may include determining that the first CSI report was received by network node 115. The first CSI report may indicate to network node 115 that wireless device 110 successfully received the dynamic allocation signaling. Thus, network node may continue transmission of semi-persistent CSI-RS with pre-configured periodicity.

In certain other embodiments determining whether a first CSI report is transmitted by wireless device 110 may include determining that the first CSI report was not received by network node 115. Not receiving the first CSI report may indicate to network node 115 that wireless device 110 did not successfully receive the dynamic allocation signaling. Thus, network node 115 may retransmit the dynamic allocation signaling to wireless device 110. According to a particular embodiment, wireless device 110 may cease transmission of the semi-persistent CSI-RS reports after a predetermined length of time. In other embodiments, network node 115 may transmit dynamic deallocation signaling to terminate the measurement of on the semi-persistent CSI-RS resource by the wireless device 110. Additionally, network node 115 may determine whether a second CSI report is transmitted by the wireless device in response to the dynamic deallocation signaling and take an action based on whether the second CSI report is transmitted by the wireless device in response to the dynamic allocation signaling.

Figure 20:
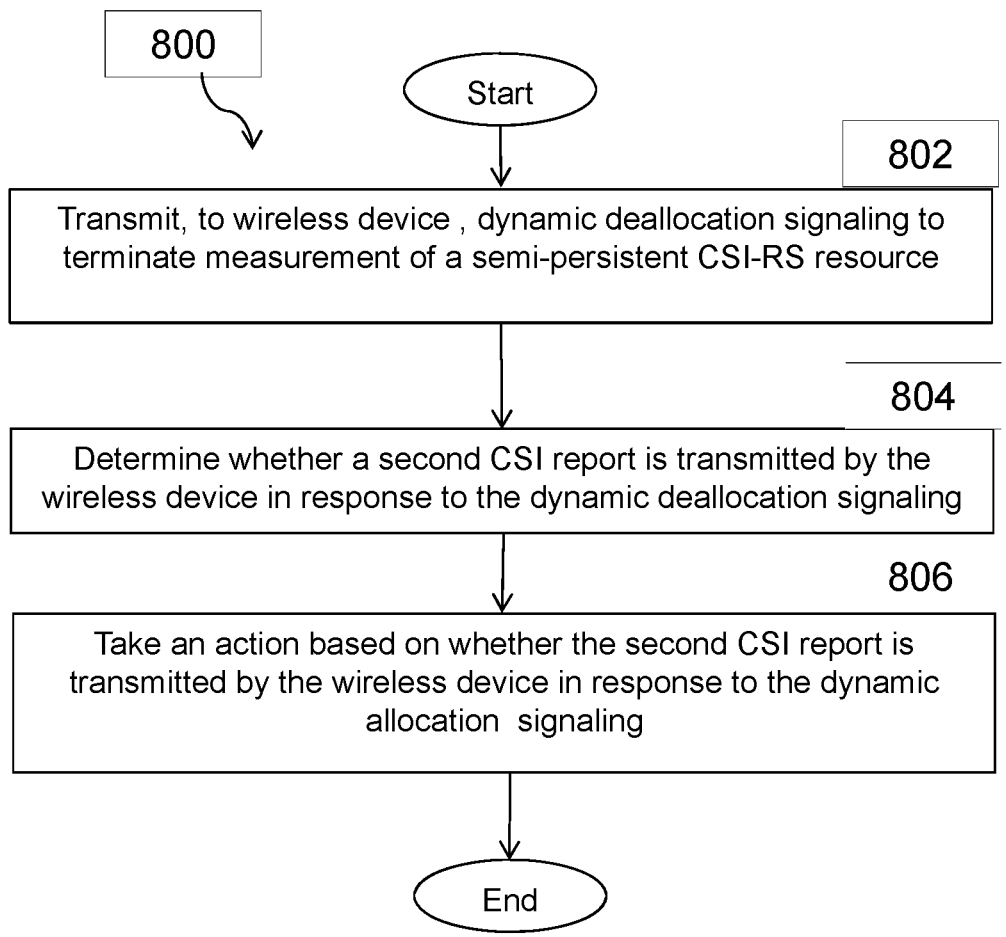
FIG. 20 illustrates an example method by a network node for terminating semi-persistent CSI measurements on a CSI-RS resource configured by higher layers, according to certain embodiments.

FIG. 20 illustrates an example method by network node 115 for terminating semi-persistent CSI measurements on a CSI-RS resource configured by higher layers, according to certain embodiments. The method begins at step 802 when network node 115 transmits to wireless device 110 dynamic deallocation signaling to terminate measurement on a semi-persistent CSI-RS resource. In a particular embodiment, the dynamic deallocation signaling may include DCI.

At step 806, network node 115 determines whether a second CSI report is transmitted by wireless device 110 in response to the dynamic deallocation signaling. At step 808, network node 115 takes an action based on whether the second CSI report is received in response to the dynamic deallocation signaling.

In certain embodiments, it may be determined that the second CSI report was received. Receipt of the second CSI report may indicate to network node 115 that wireless device 110 did not receive the dynamic deallocation signaling. Thus, network node 115 may take further action to retransmit the dynamic deallocation signaling.

In certain embodiments, it may be determined that the second CSI report was not received. Failure to receive a second CSI report may indicate to network node 115 that wireless device 110 successfully received the dynamic deallocation signaling. Thus, network node 115 may take further action by terminating periodic transmission of CSI-RS.

Figure 21:
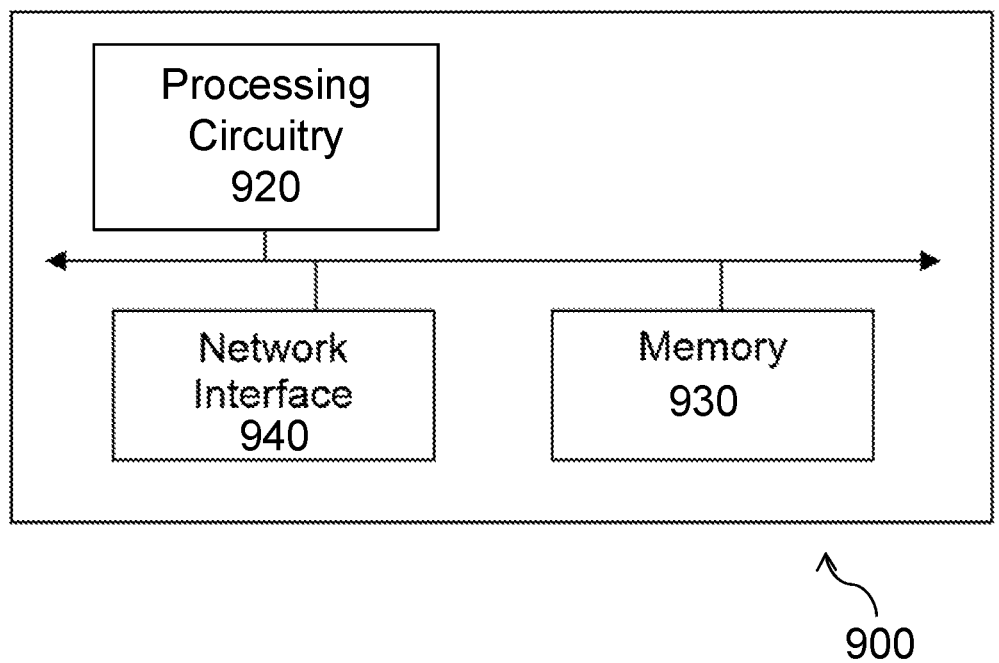
FIG. 21 illustrates an exemplary radio network controller or core network node reliable dynamic indication for semi-persistent CSI-RS, according to certain embodiments.

FIG. 21 illustrates an exemplary radio network controller or core network node 900, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 900 include processor or processing circuitry 920, memory 930, and network interface 940. In some embodiments, processor 920 executes instructions to provide some or all of the functionality described above as being provided by the network node, memory 930 stores the instructions executed by processor 920, and network interface 940 communicates signals to any suitable node, such as a gateway, switch, router, Internet, Public Switched Telephone Network (PSTN), network nodes 115, radio network controllers or core network nodes 900, etc.

Processor 920 may include any suitable combination of hardware and software implemented in one or more modules to execute instructions and manipulate data to perform some or all of the described functions of the radio network controller or core network node 900. In some embodiments, processor 920 may include, for example, one or more computers, one or more central processing units (CPUs), one or more microprocessors, one or more applications, and/or other logic.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 940 is communicatively coupled to processor 920 and may refer to any suitable device operable to receive input for the network node, send output from the network node, perform suitable processing of the input or output or both, communicate to other devices, or any combination of the preceding. Network interface 940 may include appropriate hardware (e.g., port, modem, network interface card, etc.) and software, including protocol conversion and data processing capabilities, to communicate through a network.

Other embodiments of the network node may include additional components beyond those shown in FIG. 21 that may be responsible for providing certain aspects of the network node's functionality, including any of the functionality described above and/or any additional functionality (including any functionality necessary to support the solution described above).

According to certain embodiments, a method in a wireless device may be provided for initiating semi-persistent CSI measurements on a CSI-RS resource configured by higher layers, wherein the resource is used for CSI reporting, for which resource the wireless device is not currently performing measurements. The method may include:

receiving, from a network node, a dynamic allocation trigger to commence measurement of a semi-persistent CSI-RS resource;

performing a first measurement of the CSI-RS resource;

transmitting, to the network, a first CSI report based only on the first measurement;

optionally, the dynamic allocation trigger initiates semi-persistent CSI measurements on the CSI-RS resource and also triggers the first CSI report;

optionally, the CSI reporting except for the first CSI report is triggered by a trigger message different than the dynamic allocation trigger message;

optionally, the CSI report is an aperiodic report;

optionally, the CSI report is a semi-persistent report;

optionally, semi-persistent CSI-RS are transmitted for a predetermined length of time, and semi-persistent CSI-RS transmissions cease after the predetermined length of time, and the UE stops providing CSI reports corresponding to the semi-persistent CSI-RS;

optionally, the dynamic allocation trigger comprises at least one of the following: an indication of semi-persistent CSI-RS measurement initiation, an indication of semi-persistent CSI-RS configuration index/indices, and an uplink resource allocation and associated modulation and coding rate;

optionally, the method further includes receiving a dynamic deallocation trigger for the semi-persistent CSI-RS and ceasing transmission of CSI reports corresponding to the semi-persistent CSI-RS after receiving the dynamic deallocation trigger.

According to certain embodiments, a wireless device is provided for initiating semi-persistent CSI measurements on a CSI-RS resource configured by higher layers, wherein the resource is used for CSI reporting, for which resource the wireless device is not currently performing measurements. The wireless device may include:

a memory storing instructions; and processing circuitry operable to execute the instructions to cause the processing circuitry to:

receive, from a network node, a dynamic allocation trigger to commence measurement of a semi-persistent CSI-RS resource;

perform a first measurement of the CSI-RS resource; and transmit, to the network, a first CSI report based only on the first measurement;

optionally, the dynamic allocation trigger initiates semi-persistent CSI measurements on the CSI-RS resource and also triggers the first CSI report;

optionally, the CSI reporting except for the first CSI report is triggered by a trigger message different than the dynamic allocation trigger message;

optionally, the CSI report is an aperiodic report;

optionally, the CSI report is a semi-persistent report;

optionally, semi-persistent CSI-RS are transmitted for a predetermined length of time, and semi-persistent CSI-RS transmissions cease after the predetermined length of time, and the processing circuitry is operable to stop providing CSI reports corresponding to the semi-persistent CSI-RS;

optionally, the dynamic allocation trigger comprises at least one of the following: an indication of semi-persistent CSI-RS measurement initiation, an indication of semi-persistent CSI-RS configuration index/indices, and an uplink resource allocation and associated modulation and coding rate;

According to certain embodiments, method in a wireless device for terminating semi-persistent CSI measurements on a CSI-RS resource configured by higher layers, wherein the resource is used for CSI reporting, for which resource the wireless device is currently performing measurements. The method may include receiving a dynamic deallocation trigger to terminate semi-persistent measurements on a CSI-RS resource; and terminating the semi-persistent measurements on the CSI-RS resource.

According to certain embodiments, a wireless device for terminating semi-persistent CSI measurements on a CSI-RS resource configured by higher layers, wherein the resource is used for CSI reporting, for which resource the wireless device is currently performing measurements, the wireless device comprising:

a memory storing instructions; and processing circuitry operable to execute the instructions to cause the processing circuitry to:

receive, from a network node, a dynamic deallocation trigger to terminate semi-persistent measurements on a CSI-RS resource;

terminate, the semi-persistent measurements on the CSI-RS resource.

According to certain embodiments, a method in a network node for initiating semi-persistent CSI measurements on a CSI-RS resource by a wireless device configured by higher layers, wherein the resource is used for CSI reporting, for which resource the wireless device is not currently performing measurements. The method may include transmitting, to the wireless device, a dynamic allocation trigger to initiate measurement of a semi-persistent CSI-RS resource;

determining whether a first CSI report is received in response to the dynamic allocation trigger; and taking an action based on whether the first CSI report is received in response to the dynamic allocation trigger;

optionally, it may be determined the first CSI report was received, indicating that the wireless device successfully received the dynamic allocation trigger, and taking the action further comprises continue transmission of semi-persistent CSI-RS with preconfigured periodicity;

optionally, it may be determined that the first CSI report was not received, indicating that the wireless device did not receive the dynamic allocation trigger; and taking the action further comprises retransmitting the dynamic allocation trigger to the wireless device.

According to certain embodiments, a network node for initiating semi-persistent CSI measurements on a CSI-RS resource by a wireless device configured by higher layers, wherein the resource is used for CSI reporting, for which resource the wireless device is not currently performing measurements. The network node may include:

a memory storing instructions; and processing circuitry operable to execute the instructions to cause the processing circuitry to:

transmit, to the wireless device, a dynamic allocation trigger to initiate measurement of a semi-persistent CSI-RS resource;

determine whether a first CSI report is received in response to the dynamic allocation trigger; and take an action based on whether the first CSI report is received in response to the dynamic allocation trigger.

optionally, it may be determined the first CSI report was received, indicating that the wireless device successfully received the dynamic allocation trigger, and taking the action further comprises continue transmission of semi-persistent CSI-RS with preconfigured periodicity;

optionally, it may be determined that the first CSI report was not received, indicating that the wireless device did not receive the dynamic allocation trigger; and taking the action further comprises retransmitting the dynamic allocation trigger to the wireless device.

According to certain embodiments, a method in a network node for terminating semi-persistent CSI measurements on a CSI-RS resource by a wireless device configured by higher layers, wherein the resource is used for CSI reporting, for which resource the wireless device is currently performing measurements. The method may include:

transmitting, to the wireless device, a dynamic deallocation trigger to terminate measurement of a semi-persistent CSI-RS resource; and determining whether a first CSI report is received in response to the dynamic deallocation trigger; and taking an action based on whether the first CSI report is received in response to the dynamic deallocation trigger;

optionally, it may be determined the first CSI report was received, indicating that the wireless device did not receive the dynamic deallocation trigger, and taking the action may include retransmitting the dynamic deallocation trigger;

optionally, it may be determined that the first CSI report was not received, indicating that the wireless device received the dynamic allocation trigger; and taking the action may include terminating periodic transmission of CSI-RS.

According to certain embodiments, a network node for terminating semi-persistent CSI measurements on a CSI-RS resource by a wireless device configured by higher layers, wherein the resource is used for CSI reporting, for which resource the wireless device is currently performing measurements. The network node a memory storing instructions; and processing circuitry operable to execute the instructions to cause the processing circuitry to:

transmit, to the wireless device, a dynamic deallocation trigger to terminate measurement of a semi-persistent CSI-RS resource;

determine whether a first CSI report is received in response to the dynamic deallocation trigger; and take an action based on whether the first CSI report is received in response to the dynamic deallocation trigger;

optionally, it may be determined the first CSI report was received, indicating that the wireless device did not receive the dynamic deallocation trigger, and taking the action may include retransmitting the dynamic deallocation trigger;

optionally, it may be determined that the first CSI report was not received, indicating that the wireless device received the dynamic allocation trigger; and taking the action may include terminating periodic transmission of CSI-RS.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
CRS—Cell-specific Reference Signal
CSI-RS—Channel State Information Reference Signal
gNB—NR base station node
HARQ—Hybrid Automatic Repeat-reQuest
NW—Network
PDCCH—Physical Downlink Control Channel
PRB—Physical Resource Block
RRC—Radio Resource Control
UE—User Equipment

The invention claimed is:

1. A method in a wireless device for initiating semi-persistent channel state information, CSI, measurements, the method comprising:
receiving, from a network node, dynamic allocation signaling, the dynamic allocation signaling triggering the wireless device to commence measurement on a semi-persistent channel state information-reference signal, CSI-RS, resource;
in response to receiving the dynamic allocation signaling, performing a first measurement on the semi-persistent CSI-RS resource;
receiving, from the network node, an aperiodic CSI report trigger message triggering an aperiodic CSI report, the aperiodic CSI report trigger message being different than the dynamic allocation signaling;
transmitting, to the network node, the aperiodic CSI report based only on the first measurement for which measurement was triggered on the semi-persistent CSI-RS resource by the dynamic allocation signaling;
receiving, from the network node, a semi-persistent CSI report trigger message that is different than the dynamic allocation signaling and the aperiodic CSI report trigger message, the semi-persistent CSI report trigger message triggering semi-persistent CSI reporting; and
initiating semi-persistent CSI reporting based on subsequent measurements of the semi-persistent CSI-RS resource.

2. The method according to claim 1, wherein the dynamic allocation signaling comprises a MAC control element, MAC CE.

3. The method according to claim 1, wherein the semi-persistent CSI report trigger message comprises downlink control information, DCI.

4. The method according to claim 1, wherein initiating semi-persistent CSI reporting comprises transmitting a plurality of semi-persistent CSI reports.

5. The method according to claim 4, further comprising:
ceasing transmission of the plurality of semi-persistent CSI-RS reports after a predetermined length of time.

6. The method according to claim 1, where the first CSI report is an aperiodic report.

7. The method according to claim 1, where the first CSI report is a semi-persistent report.

8. The method according to claim 1, wherein the dynamic allocation signaling comprises at least one of the following:
an indication of semi-persistent CSI-RS measurement initiation;
an indication of semi-persistent CSI-RS resource configuration index/indices; and
an uplink resource allocation and associated modulation and coding rate.

9. The method according to claim 1, wherein the semi-persistent CSI-RS resource comprises a CSI-RS resource that is configured with at least a CSI-RS transmission periodicity and for which at least one wireless device assumption on transmission and cessation of CSI-RS transmission applies.

10. The method according to claim 1 wherein:
the semi-persistent CSI-RS resource is configured for transmission of CSI-RS at a configured periodicity for a limited time duration; and
receipt of the dynamic allocation is required to trigger to transmission of the semi-persistent CSI-RS on the semi-persistent CSI-RS resource.

11. The method according to claim 1, further comprising:
receiving dynamic deallocation signaling to terminate the measurement of on the semi-persistent CSI-RS resource; and
in response to the dynamic deallocation signaling, ceasing the semi-persistent measurements on the semi-persistent CSI-RS resource.

12. A wireless device for initiating semi-persistent channel state information, CSI, measurements, the wireless device comprising:
a memory storing instructions; and
processing circuitry operable to execute the instructions to cause the wireless device to:
in response to receiving the dynamic allocation signaling, receive, from a network node, dynamic allocation signaling, the dynamic allocation signaling triggering the wireless device to commence measurement on a semi-persistent channel state information-reference signal, CSI-RS, resource;
perform a first measurement on the semi-persistent CSI-RS resource;

receive, from the network node, an aperiodic CSI report trigger message triggering an aperiodic CSI report, the aperiodic CSI report trigger message being different than the dynamic allocation signaling;

transmit, to the network node, the aperiodic CSI report based only on the first measurement for which measurement was triggered on the semi-persistent CSI-RS resource by the dynamic allocation signaling;

receive, from the network node, a semi-persistent CSI report trigger message that is different than the dynamic allocation signaling and the aperiodic CSI report trigger message, the semi-persistent CSI report trigger message triggering semi-persistent CSI reporting; and initiate semi-persistent CSI reporting based on subsequent measurements of the semi-persistent CSI-RS resource.

13. The wireless device according to claim 12, wherein the dynamic allocation signaling comprises a MAC control element, MAC CE.

14. The wireless device according to claim 12, wherein the semi-persistent CSI report trigger message comprises downlink control information, DCI.

15. The wireless device according to claim 12, wherein initiating semi-persistent CSI reporting comprises transmitting a plurality of semi-persistent CSI reports.

16. The wireless device according to claim 15, wherein the processing circuitry is operable to execute the instructions to cause the wireless device to:

cease transmission of the plurality of semi-persistent CSI-RS reports after a predetermined length of time.

17. A method in a network node for initiating semi-persistent channel state information, CSI, measurements, the method comprising:

transmitting, to the wireless device, dynamic allocation signaling, the dynamic allocation signaling triggering the wireless device to initiate measurement on a semi-persistent channel state information-reference signal, CSI-RS, resource for which the wireless device is not currently performing measurements;

transmitting, to the wireless device, an aperiodic CSI report trigger message triggering an aperiodic CSI report, the aperiodic CSI report trigger message being different than the dynamic allocation signaling;

receiving, from the wireless device, the aperiodic CSI report based only on a first measurement for which measurement was triggered on the semi-persistent CSI-RS resource by the dynamic allocation signaling; and transmitting, to the wireless device, a semi-persistent CSI report trigger message that is different from the dynamic allocation signaling and the aperiodic CSI report trigger message, the semi-persistent CSI report trigger message triggering semi-persistent CSI reporting; and receiving semi-persistent CSI reporting based on subsequent measurements of the semi-persistent CSI-RS resource by the wireless device.

18. The method according to claim 17, wherein the dynamic allocation signaling comprises a MAC control element, MAC CE.

19. The method of claim 17, further comprising:

based on receiving the aperiodic CSI report, determining that the wireless device successfully received the dynamic allocation signaling; and wherein the semi-persistent CSI report trigger message is transmitted to the wireless device to trigger semi-persistent CSI reporting in response to determining that the wireless device successfully received the dynamic allocation signaling.

20. The method according to claim 17, wherein the semi-persistent CSI report trigger message comprises downlink control information, DCI.

21. The method according to claim 17, wherein the dynamic allocation signaling comprises at least one of the following:

an indication of semi-persistent CSI-RS measurement initiation;

an indication of semi-persistent CSI-RS resource configuration index/indices; and an uplink resource allocation and associated modulation and coding rate.

22. The method according to claim 17, wherein the semi-persistent CSI-RS resource comprises a CSI-RS resource that is configured with at least a CSI-RS transmission periodicity and for which at least one wireless device assumption on transmission and cessation of CSI-RS transmission applies.

23. The method according to claim 17 wherein:

the semi-persistent CSI-RS resource is configured for transmission of CSI-RS at a configured periodicity for a limited time duration; and receipt of the dynamic allocation is required to trigger to transmission of the semi-persistent CSI-RS on the semi-persistent CSI-RS resource.

24. The method according to claim 17, further comprising:

transmitting dynamic deallocation signaling to terminate the measurement on the semi-persistent CSI-RS resource by the wireless device;

determine whether a second CSI report is transmitted by the wireless device in response to the dynamic deallocation signaling; and take an action based on whether the second CSI report is transmitted by the wireless device in response to the dynamic allocation signaling.

25. A network node for initiating semi-persistent channel state information, CSI, measurements, the network node comprising:

a memory storing instructions; and processing circuitry operable to execute the instructions to cause the network node to:

transmit, to the wireless device, dynamic allocation signaling, the dynamic allocation signaling triggering the wireless device to initiate measurement on a semi-persistent channel state information-reference signal, CSI-RS, resource for which the wireless device is not currently performing measurements;

transmit, to the wireless device, an aperiodic CSI report trigger message triggering an aperiodic CSI report, the aperiodic CSI report trigger message being different than the dynamic allocation signaling;

receive, from the wireless device, the aperiodic CSI report based only on a first measurement for which measurement was triggered on the semi-persistent CSI-RS resource by the dynamic allocation signaling;

transmit, to the wireless device, a semi-persistent CSI report trigger message that is different from the dynamic allocation signaling and the aperiodic CSI report trigger message, the semi-persistent CSI report trigger message triggering semi-persistent CSI reporting; and receive semi-persistent CSI reporting based on subsequent measurements of the semi-persistent CSI-RS resource by the wireless device.

\* \* \* \* \*

UNITED STATES PATENT AND TRADEMARK OFFICE
CERTIFICATE OF CORRECTION

| | |
|---|---|
| PATENT NO. | : 11,184,787 B2 |
| APPLICATION NO. | : 15/765784 |
| DATED | : November 23, 2021 |
| INVENTOR(S) | : Siva Muruganathan et al. |

It is certified that error appears in the above-identified patent and that said Letters Patent is hereby corrected as shown below:

On the Title Page

Under Item (73), under "ASSIGNEE", please delete "Telefonaktiebolaget LM Ericcson (publ)" and insert -- Telefonaktiebolaget LM Ericsson (publ) --, therefor.

Signed and Sealed this
Fourteenth Day of February, 2023

Katherine Kelly Vidal
*Director of the United States Patent and Trademark Office*